United States Patent [19]

Halpern et al.

[11] Patent Number: 4,649,549

[45] Date of Patent: Mar. 10, 1987

[54] APPARATUS FOR SYNCHRONIZING LINEAR PN SEQUENCES

[75] Inventors: Peter H. Halpern, Longwood; Peter E. Mallory, Edgewater; Paul E. Haug, Sanford; William M. Koos, Jr., Altamonte Spring, all of Fla.

[73] Assignee: Sophisticated Signals and Circuits, Longwood, Fla.

[21] Appl. No.: 632,001

[22] Filed: Jul. 18, 1984

Related U.S. Application Data

[63] Continuation-in-part of Ser. No. 529,706, Aug. 30, 1983, abandoned.

[51] Int. Cl.[4] .............................. H04K 1/02; H04J 6/00
[52] U.S. Cl. ............................................ 380/32; 375/1; 375/106; 375/115; 380/35; 380/44
[58] Field of Search ................... 375/1, 2.2, 106, 114, 375/115, 118, 119, 120; 178/22.17

[56] References Cited

U.S. PATENT DOCUMENTS

| | | | |
|---|---|---|---|
| 4,270,209 | 5/1981 | Albanese | 375/115 |
| 4,308,617 | 12/1981 | German, Jr. | 375/1 |
| 4,320,514 | 3/1982 | Haskell | 375/1 |
| 4,355,399 | 10/1982 | Timor | 375/1 |
| 4,383,323 | 5/1983 | Timor | 375/1 |
| 4,447,907 | 5/1984 | Bjornholt et al. | 375/1 |
| 4,468,792 | 8/1984 | Baker et al. | 375/1 |
| 4,545,061 | 10/1985 | Hilman | 375/2.2 |
| 4,567,588 | 1/1986 | Jerrim | 375/1 |

*Primary Examiner*—Salvatore Cangialosi
*Attorney, Agent, or Firm*—Laubscher & Laubscher

[57] ABSTRACT

A system and method are disclosed for synchronizning the linear PN sequences contained in a received spread spectrum signal, characterized by the provision of a resident PN generator that is responsive to the chip rate clock for producing a replica of the PN sequence with arbitrary phase, a running matrix inverse of the matrix (R) formed by n successive observations of the register of the resident generator, and a matrix vector product device for multiplying the running inverse by a column vector of noisy chips, thereby to obtain a plurality of estimates of the phase vector. These estimates are smoothed and averaged to produce the smoothed phase vector ($c_j$) that is applied to one input of a dot product device that operates in conjunction with the contents of the shift register of the resident generator to produce the properly phased PN sequence, which sequence is then supplied to despreading means for combining the noisy chips with the properly phased PN sequence. The system may be used for range computation, if desired.

13 Claims, 16 Drawing Figures

Fig. 6 REFINED AVERAGING METHOD FOR TAP WEIGHTS

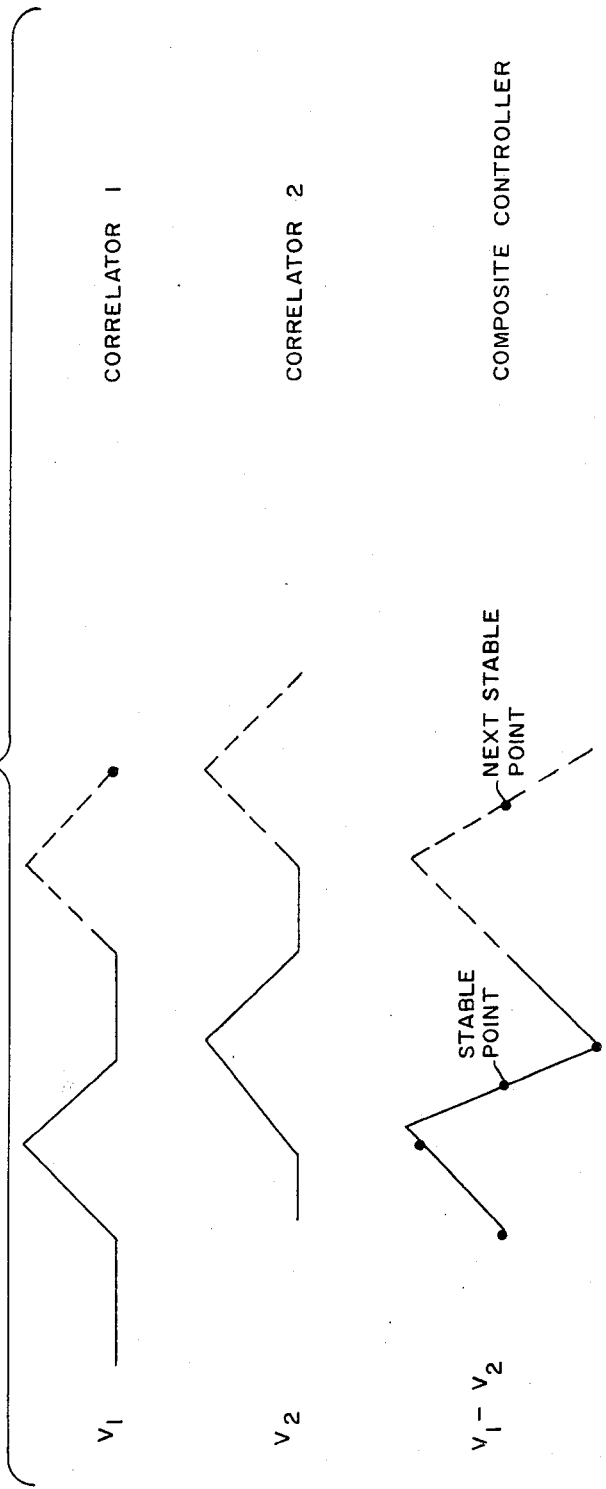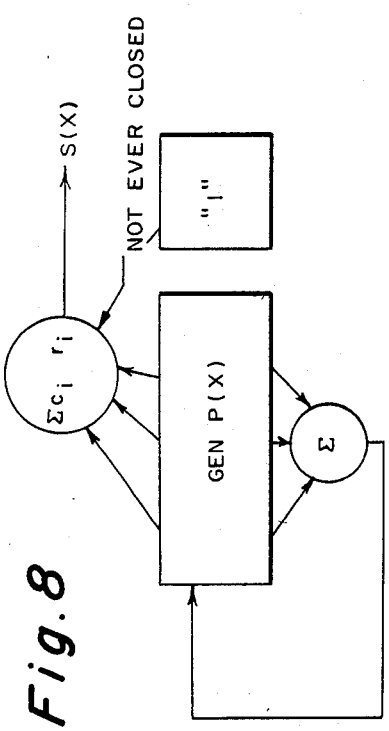

APPARATUS FOR SYNCHRONIZING LINEAR PN SEQUENCES

REFERENCE TO PRIOR APPLICATION

This application is a continuation-in-part application of our prior U.S. application Ser. No. 529,706 filed Aug. 30, 1983, now abandoned.

BRIEF DESCRIPTION OF THE PRIOR ART

Spread spectrum communication systems are well known in the prior art, as described, for example, in the treatise *Spread Spectrum Systems*, by Robert C. Dixon, John Wiley & Sons, Inc., New York, N.Y., 1976. Literally, a spread spectrum system is one in which the transmitted signal is spread over a frequency band wider than the minimum bandwidth required to transmit the information being sent. Thus, a baseband signal (i.e., a voice channel) with a bandwidth of only a few kiloHertz may be distributed over a band that may be many megaHertz wide. This is accomplished by modulating with the information to be sent and with a wideband encoding signal.

Code synchronization is required in all spread spectrum systems, since the code is the key to despreading desired information and to spreading any undesired signals.

In a variety of communications and ranging systems a linear pseudo noise sequence is used. These sequences are valuable for spreading the bandwidth and for providing timing signals for ranging. Spreading is usually done in order to combat intentional or unintentional narrowband jamming. Once the receiver has synchronized to the sequence, the signal may be despread and the data demodulated with attendant processing gain.

In the past, the receiver was forced to slew the clock for a linear PN sequence to line up the receiver generator with the transmitted sequence. For long sequences or sequences received in heavy noise (i.e., noise power density which is of the order of, or exceeds the energy per chip), such typical methods as "the sliding correlation" are impractical because of the large number of phases which must be tested with attendant dwell time required in heavy noise.

SUMMARY OF THE INVENTION

The present invention was developed to avoid the above and other drawbacks of the known synchronizing systems, and for synchronizing a linear PN sequence directly without slewing a generator and correlating. The system is algebraic and has been proven to work even if the received noise is larger than 40 db greater than the signal.

In accordance with a primary object of the invention, the system includes demodulator means for separating from the received signal the noisy wideband PN spread spectrum component, and for generating a chip clock rate signal, resident PN generator means responsive to the chip rate clock signal for producing a replica of the PN sequence with arbitrary phase, running matrix inverse means for obtaining the inverse of the matrix (R) formed by n successive observations of the register (4) of the resident generator, matrix vector product means for multiplying the running inverse by a column vector of noisy chips, thereby to obtain a plurality of estimates of the phase vector, means for smoothing and averaging the phase vector estimates, thereby to produce the smoothed phase vector ($c_j$), dot product means responsive to the smooth phase vector and to the contents of the resident shift generator for producing the properly phased PN sequence, and despreading means for combining the noisy chips with the properly phased PN sequence, whereby the narrowband digital data carried by the spread spectrum signal may be recovered.

According to one embodiment of the invention, the running matrix means includes a plurality of columns i (where i=1 ... n) each including a plurality of D stage registers, a plurality of mod 2 adders connected between the registers, respectively, a plurality of AND gates having outputs connected with the mod 2 adders, respectively, each of the AND gates having a pair of input terminals, means for applying the known coefficients of recursion ($X \ldots X_{n-1}$) of the resident PN generator to one input terminal of the AND gates, respectively, means for applying to the other input terminal of each AND gate a feedback signal provided by a connection between the output of the bottom D stage and the input of the top D stage of the column, and means for loading in parallel to the D stages of each column, respectively, second signals ($Y_{1i} \ldots Y_{n-1}$) that are known a' priori functions of the coefficients of recursion thereby loading the initial running matrix inverse ($R_o^{-1}$). This initial running matrix inverse has the form:

$$R_o^{-1} = \begin{bmatrix} 1 & X_{n-1} & X_{n-2} & & & X_1 \\ 0 & 1 & X_{n-1} & & & X_2 \\ . & 0 & 1 & X_{n-1} & & . \\ . & . & 0 & & X_{n-1} & . \\ . & . & . & & & X_{n-1} \\ 0 & 0 & 0 & 0 & & 1 \end{bmatrix}$$

In a second embodiment of the invention, the running matrix inverse means includes a plurality of rows each including a plurality of D stage registers, a plurality of mod 2 adders connected between the registers, respectively, a plurality of AND gates having outputs connected with the mod 2 adders, respectively, each of said AND gates having a pair of input terminals, means for applying the known coefficients of recursion ($X_1 \ldots X_{n-1}$) to one input terminal of the AND gates, respectively, means for applying to the other input terminal of each of said AND gates a feedback signal provided by a connection between the output of the last D stage and the input of the first D stage of the row, and means for loading in parallel to the D stages of each row, respectively, second signals ($Y_{i1} \ldots Y_{in}$) that are known a' priori functions of the coefficients of recursion, thereby loading the initial inverse ($R_o^{-1}$).

According to a further object of the invention, phase delay computer means are provided for converting the smoothed phase vector [$c_j$] to actual phase delay, thereby affording means for range computation.

According to another object of the invention, the matrix vector product means includes a plurality of AND gates having first inputs to which are applied the data signals [$d_1 \ldots d_n$], and second input terminals connected with corresponding D stages of the running matrix inverse. A plurality of mod 2 adders are connected with the output terminals of a plurality of the AND gates, respectively, thereby providing a plurality of phase vector estimates that are smoothed for transmission to threshold means which determine the polarity of the individual phase vector components. In one embodiment, the smoothing means comprises an up/down counter, while in another embodiment, the soothing means comprises an up/down accumulator in combination with a zero counter that determines the amount by which the up/down accumulator is incremented or decremented.

In accordance with another feature, the invention can be incorporated into a phase delay-lock loop system of the type wherein two reference signals are generated for comparison with a single incoming signal in two separate correlators. The summed correlator outputs are filtered and are used to control the operation of a voltage controlled oscillator that produces the chip rate clock signal.

In a further modification, the resident PN generator means includes a plurality of D stage registers, a plurality of mod 2 adders connected between the registers, respectively, a plurality of AND gates (310) having outputs connected with the mod 2 adders, respectively, each of the AND gates having a pair of input terminals, means for applying the known coefficients of recursion $(X_1 \ldots X_n)$ to one input terminal of the AND gates, respectively, and means for applying to the other input terminal of each of said AND gates a feedback signal provided by a connection between the output of the last D stage and the input of the first D stage of the column. The running matrix inversion means, in this embodiment, includes a plurality of columns each including a shift register, and recursion means connected with the shift register for producing the next bit depending on the n prior bits, the recursion means having a plurality of known coefficients of recursion $(X_1 \ldots X_{n-1})$, and means for loading in parallel to the D stages of each column, respectively, second signals $(Y_{1i} \ldots Y_{ni})$ that are known a' priori functions of the coefficients of recursion, thereby loading the initial inverse $(R_o^{-1})$.

BRIEF DESCRIPTION OF THE FIGURES

Other objects and advantages of the invention will become apparent from a study of the following specification, when viewed in the light of the accompanying drawings, in which:

FIG. 8 is a modification of the apparatus of FIG. 2.

FIG. 10 illustrates the voltage signals sketched as a function of chip clock phase.

FIG. 10 illustrates a modification of the apparatus of FIG. 2.

DETAILED DESCRIPTION

As a glossary for use by the reader, in the following specification, certain terms have been used which have well-known meanings in the art, as follows:

"chips"—1's and 0's which have characteristics of randomness and are drawn from a linear PN sequence, generated at many times the data rate, and are Mod 2 added to the data to create the wideband spread spectrum signal;

"noisy chips"—chips contaminated with background noise, resulting in errors;

"noisy wideband"—chips generated at a rate higher than the data rate, and contaminated with noise, causing them to be received with errors; and "heavy noise"—noise power density which is on the order of, or exceeds the energy per chip.

Figure 1:
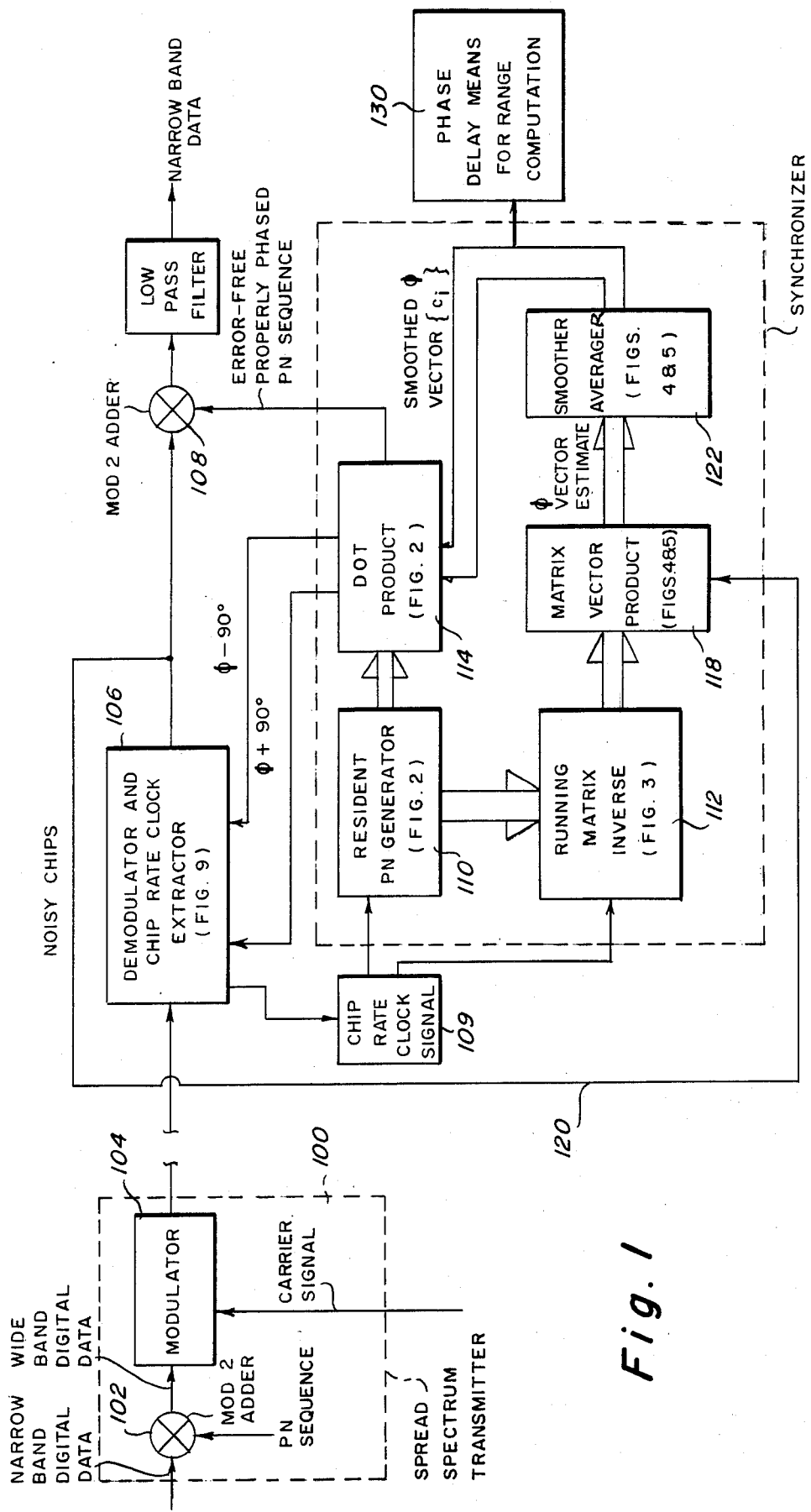
FIG. 1 is a schematic diagram of a spread spectrum system including the PN synchronizer of the present invention.

Referring first more particularly to FIG. 1, the spread spectrum transmitter 100 includes a source of narrow band digital data upon which the pseudo noise (PN) sequence is added by the MOD 2 ADDER 102, thereby to produce wideband digital data, as is known in the art. This spread spectrum base band data is then modulated with the carrier signal by modulator 104 in a known manner, such as amplitude modulation, phase modulation or frequency modulation.

At the receiver, the transmitted signal is fed to the demodulator and chip rate clock extractor 106 which produces a wideband chip output that is fed to one input terminal of the MOD 2 ADDER 108. The chip rate clock signal 109 is supplied to a resident PN generator 110 having outputs connected with the running matrix inverse 112 and with the dot product matrix 114, respectively. The output of the running matrix inverse 112 applied to one input of the matrix product 118 the other input of which is supplied via conduit 120 with a portion of the noisy chips produced by the demodulator and chip rate clock extractor 106.

The matrix product 118 produces noisy phase vector estimates that are supplied to the smoother/averager 122 to produce the smoothed phase vector $c_j$ that is supplied to the dot product device 114.

More particularly, the resident generator 110 runs synchronously with the incoming noise sequence at any arbitrary phase of the possible $2^n - 1$ phases. Any other phase can be constructed by taking a mod 2 sum of the states of the shift register generator of the resident PN generator 110. The problem is to compute which mod 2 sums of the register to take. To this end, the running inverse of the matrix of the successive observations of the shift register of the resident generator is computed, whereupon a matrix product is formed of the inverse with a vector of incoming noisy chips. The resulting phase vector estimate is smoothed to obtain $[c_j]$. A dot product of the resident register with $[c_j]$ then transforms the resident register into a noise free version of the incoming PN sequence with the proper phase.

Figure 2:
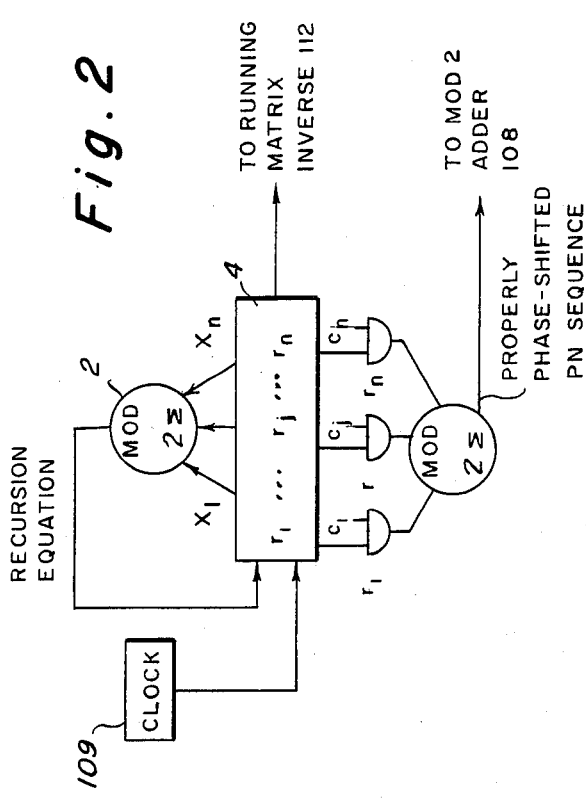
FIG. 2 is a schematic diagram illustrating the apparatus for starting the generator with arbitrary phase and for obtaining correct phase by mod 2 summing certain bits in the shift register of the generator.

(1) The Resident Generator (FIG. 2)

Referring now to FIG. 2, in order to find the phase of a linear PN sequence when received in heavy noise, any phase of a linear PN sequence is made by taking a mod 2 sum by adder 2 of some of the bits in the resident generator shift register 4. More particulary, there is a one-to-one correspondence between any of the $2^n-1$ phases and one of the non-trivial mod 2 sums of n bits of the generator register. Therefore, the problem of finding the correct phase corresponds to finding which mod 2 sum to take of the n bit shift register. The clock 109 is not slewed, but rather is kept in lock condition.

FIG. 2 illustrates the manner of starting the generator off with arbitrary phase and still obtaining the correct phase by mod 2 summing certain bits in the shift register of the generator. The problem is to determine which switch closures $[c_j]$ to make to get the correct phase. The switch closures are usually implemented with logical AND gates. The set of inputs that determine the switch closures is called a phase vector.

For a given noisy received sequence [d], an estimate of the proper phase vector on the register $[c_j]$ is obtained by solving the system of equations $$R[c] = [d] \quad (1)$$

A separate estimate is obtained every chip time, which estimates are averaged to obtain the correct estimate. Because R is known at all times, and can be shown to be invertable, [c] can be obtained as follows:

$$[c] = R^{-1}[d] \quad (2)$$

R is in principle obtained by n successive observations of the resident shift register 4 of FIG. 2.

Figure 3:
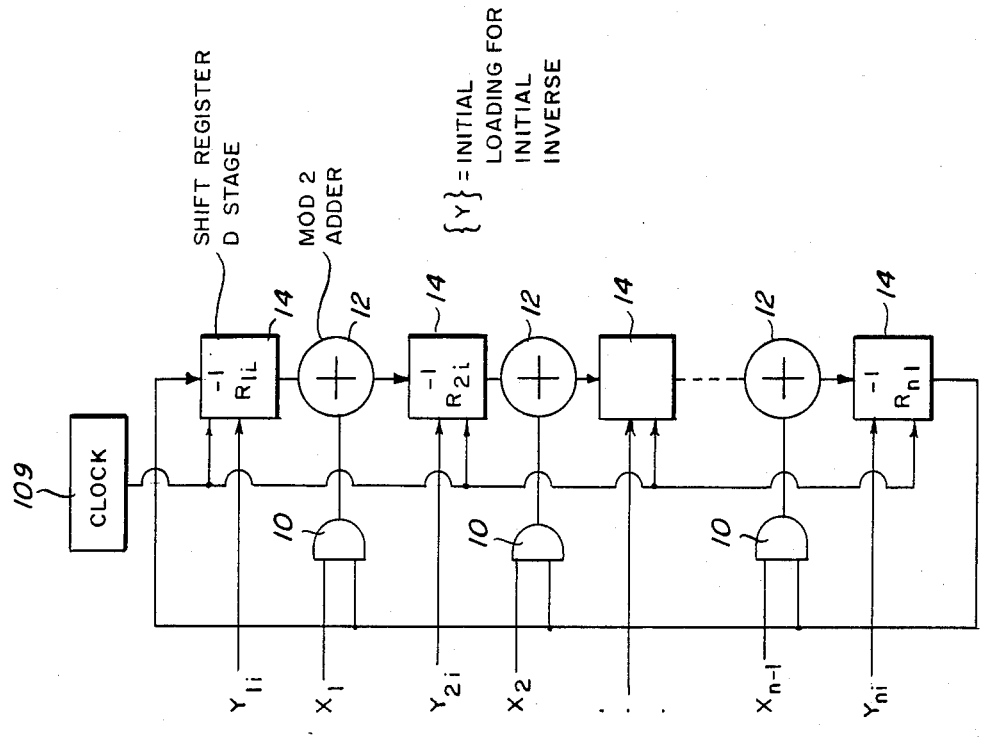
FIG. 3 is a schematic diagram of one column of a multi-column matrix inversion means.

(2) The Running Inverse (FIG. 3)

In accordance with a characterizing feature of the present invention, a fast running matrix inverse is provided having columns implemented as shown in FIG. 3. This structure avoids the otherwise enormous amount of computation which would be required every chip time for matrix inversion. More particularly, the coefficients [X] in the recursion equation of the circuit of FIG. 2 are applied to one leg of the AND gates 10, respectively, of the column of FIG. 3. The outputs of these AND gates are applied to the inputs of the MOD 2 ADDERS 12 that are connected between the shift register D stages 14. The output from the last D stage is connected with the input to the first D stage unit and to the other legs of the AND gates 10, respectively. The Y inputs are supplied to initially load the D stages, respectively. They are generally different for each column and are described below for various embodiments of the invention.

This may be mathematically explained, as follows:

The original equations for solving c can be written for any time q:

$$R_o S^q [c] = [d] \quad (3)$$

where [d] is the time varying input noisy chips of the PN sequence and $R_o$ is some initial matrix obtained by observing the generator register the first n successive times. (There is a convenient time to make this initial set-up for $R_o$ which will be discussed below).

The right shifting matrix S of equation (3) is simple and takes the form $$S = \begin{bmatrix} X_1 & 1 & 0 & . & . & 0 \\ X_2 & 0 & 1 & 0 & . & 0 \\ . & & 0 & 0 & 1 & \\ . & & & . & 0 & 1 \\ X_{n-1} & . & . & & 0 & 1 \\ 1 & & & . & . & 0 \end{bmatrix} \quad (4)$$

Solving (3) for the tap weights we have $$[c] = [S^{-1}]^q R_o^{-1} [d] \quad (5)$$

Where $S^{-1}$ is equally simple and is given by $$S^{-1} = \begin{bmatrix} 0 & . & . & & 0 & 1 \\ 1 & 0 & & & & X_1 \\ 0 & 1 & & & & X_2 \\ . & 0 & . & & & . \\ . & 0 & & & 0 & . \\ 0 & 0 & . & . & 1 & X_{n-1} \end{bmatrix} \quad (6)$$

Thus, the matrix $S^{-1}$ is a row operation whose columns are implemented as shift register depicted in FIG. 3 and as described above.

Figure 4:
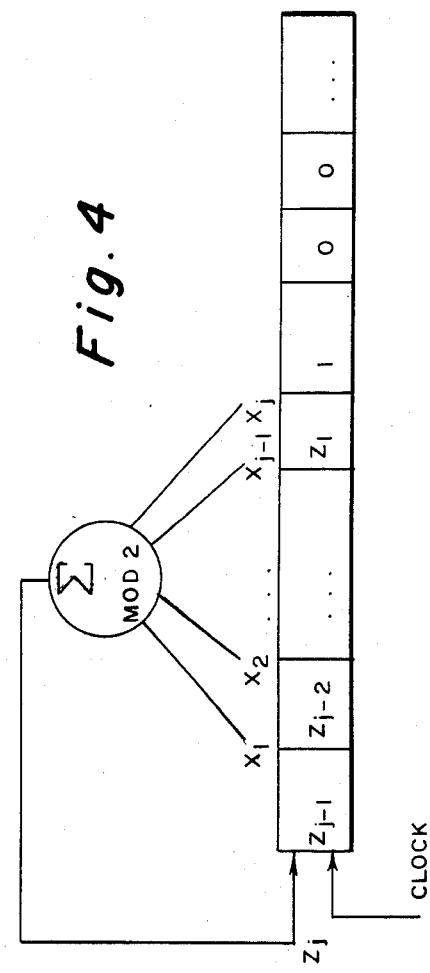
FIG. 4 is a diagrammatic illustration of a particular state of operation of the apparatus of FIG. 2.

(3) Z Generation (FIG. 4)

A second discovery is the fact that the initial $R_o^{-1}$ loading of the stages in FIG. 3 can be facilitated by observing certain states of the resident generator register. It turns out that if either the 0000 . . . 01 state or 1000 . . . 00 state is decoded, the initial inverse matrix is a trivial function of the coefficients $[X_j]$ in the generator polynomial. Consider first the matrix equation for the tap weights c. Thus, $$\begin{bmatrix} 1 & 0 & 0 & ----- & 0 \\ z_1 & 1 & 0 & ----- & 0 \\ z_2 & z_1 & 1 & 0 & 0 \\ z_3 & z_2 & z_1 & & \\ . & . & & & 0 \\ z_{n-1} & z_{n-2} & . & . & z_2 & z_1 & 1 \end{bmatrix} \begin{bmatrix} c_1 \\ c_2 \\ . \\ . \\ . \\ c_n \end{bmatrix} = \begin{bmatrix} d_1 \\ d_2 \\ d_3 \\ . \\ . \\ d_n \end{bmatrix} \quad (7)$$

or, succinctly:

$$[R_o] \times [c] = [d] \quad (7b)$$

Where the arrow indicates direction of movement of data with time. The matrix on the LHS is lower triangular with constant diagonals. As such, it has a simple inverse.

This matrix has an inverse which is also lower triangular with constant diagonals.

$$R_o^{-1} = \begin{bmatrix} 1 & 0 & 0 & -- & 0 \\ X_1 & 1 & 0 & & 0 \\ X_2 & X_1 & 1 & & 0 \\ . & X_2 & . & . & . \\ . & & & & 0 \\ X_{n-1} & & X_2 & X_1 & 1 \end{bmatrix} \quad (8)$$

The matrices in (7) and (8) will be inverses if and only if $Z_1 = X_1$ $Z_2 = X_2 + X_1 Z_1 = X_1 + X_2$ (9)

$Z_3 = X_3 + X_2 Z_1 + X_1 Z_2$ or in general $$Z_j = X_j + \sum_{k=1}^{j-1} X_{j-k} Z_k \quad (10a)$$

This is derived by forming row reductions on (8) and can be easily verified. The shift register generator of FIG. 4 illustrates how the Zs are formed, which shift register corresponds with that of FIG. 2.
Thus:

$$Z_j = X_j + \sum_{k=1}^{j-1} X_{j-k} Z_k \quad (10a)$$

and the $X_j$ is used to load $R_o^{-1}$ exactly $n-1$ bit delays after decoding the 1000...0 state. It is somewhat easier to use the 000...01 state. Then the inverse is upper triangular and takes the form:

$$R_o^{-1} = \begin{bmatrix} 1 & X_{n-1} & X_{n-2} & & X_1 \\ 0 & 1 & X_{n-1} & & X_2 \\ . & 0 & 1 & X_{n-1} & . \\ . & . & 0 & & X_{n-1} & . \\ . & . & & & & X_{n-1} \\ 0 & 0 & 0 & 0 & & 1 \end{bmatrix} \quad (11)$$

This is equally easy to verify. This $R_o^{-1}$ is loaded immediately after decoding the 0000...01 state. Equation (11) is an example of the set of Y's that is loaded into the D stages 14 of FIG. 3.

Figure 5:
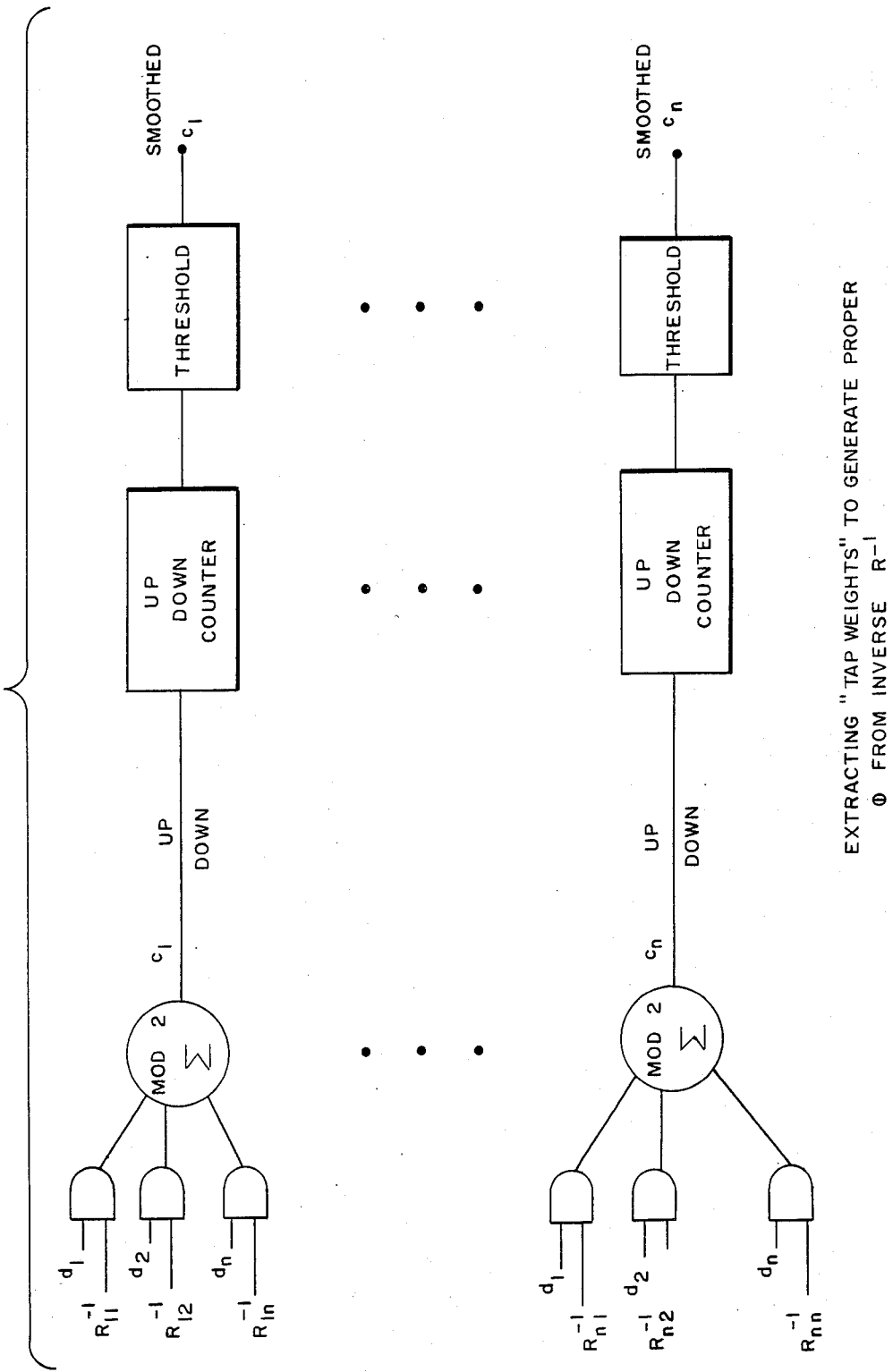
FIGS. 5 and 6 are block diagrams illustrating the manner extracting tap weights to generate proper phase, and the refined averaging method for tap weights, respectively.
Figure 6:
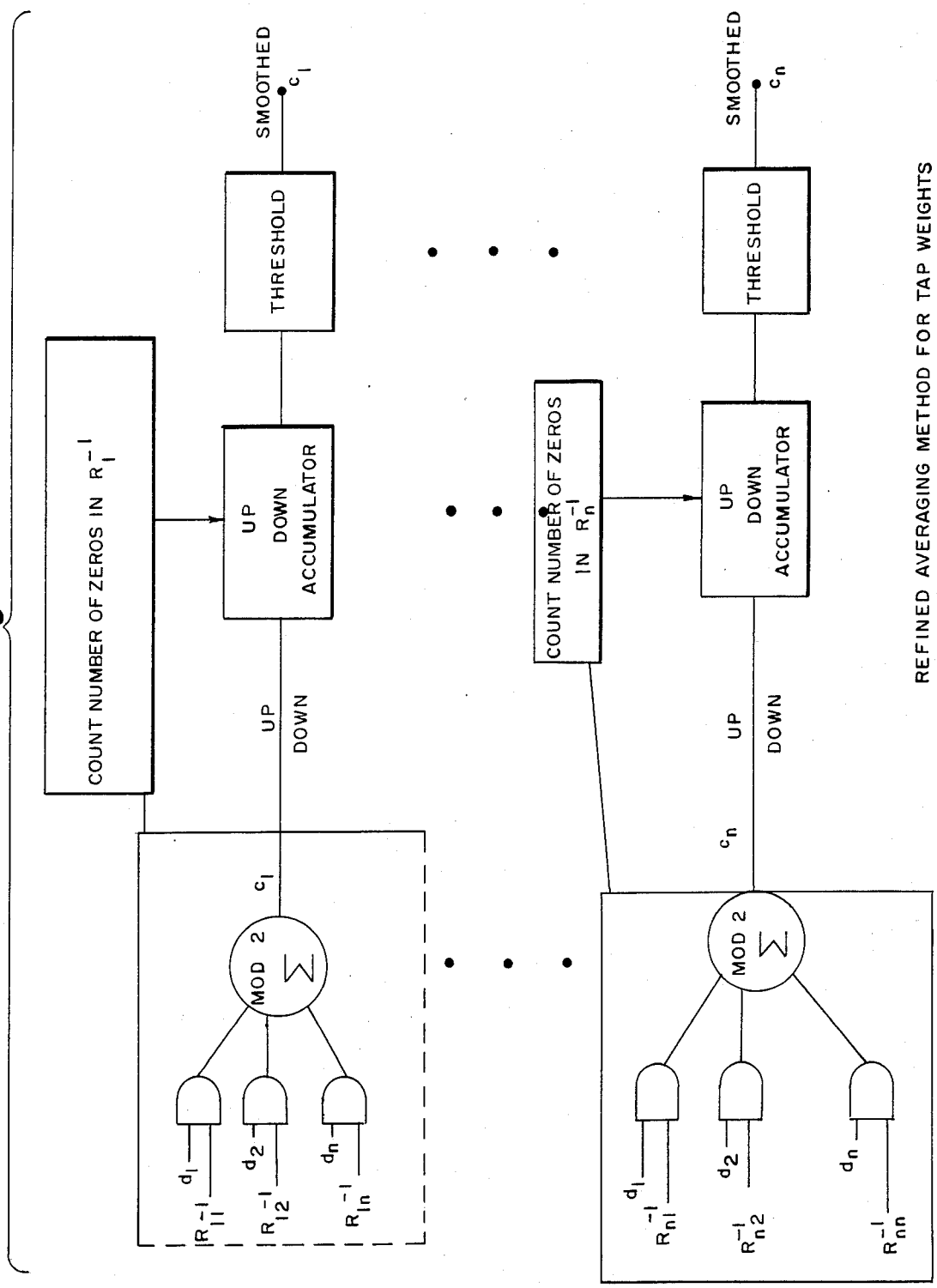
Figure 7:
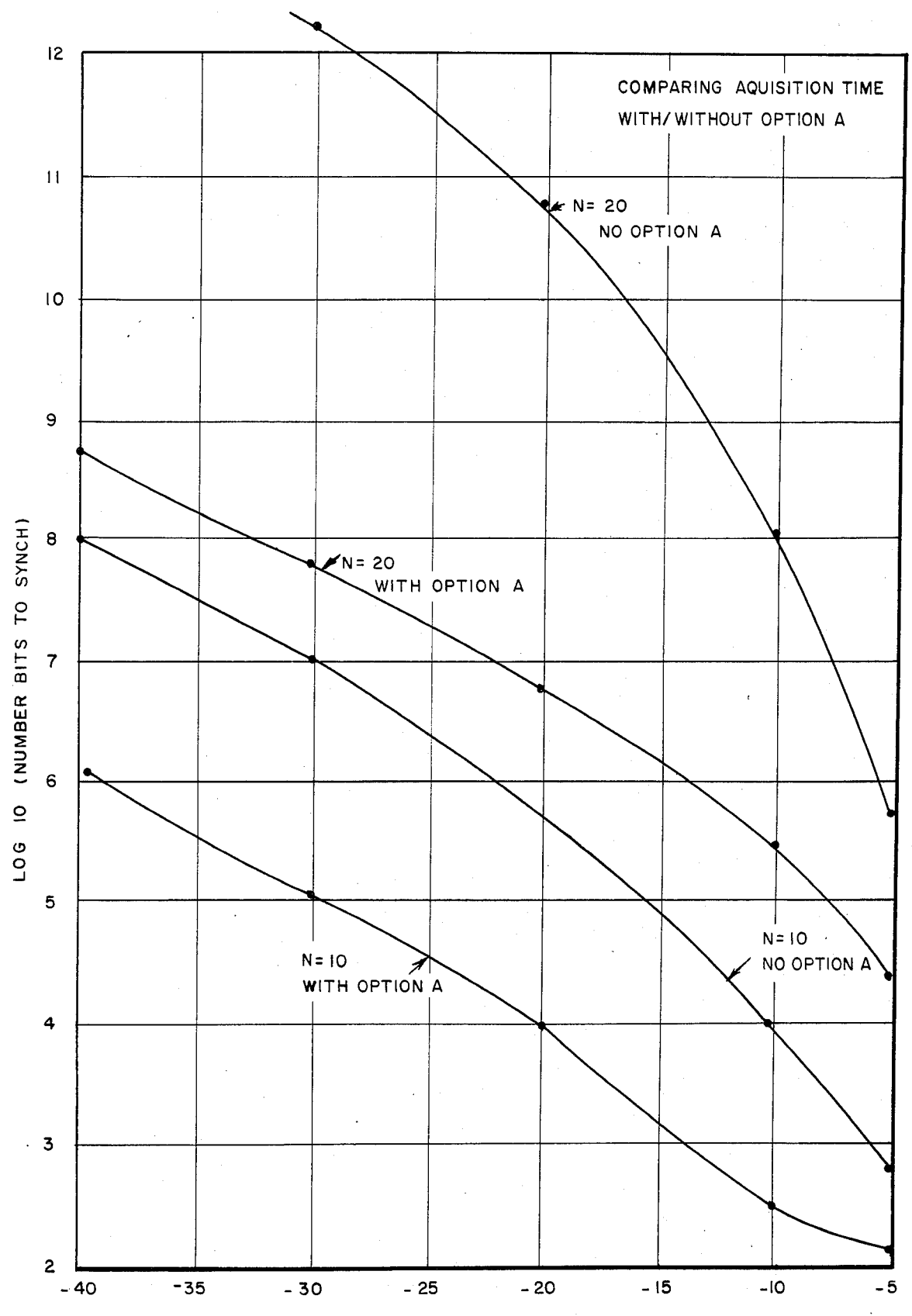
FIG. 7 is a graphic representation comparing acquisition times as a function of generator register length n and SNR converted via Gaussian densities to raw bit error probability p.

(4) The Matrix Product and Smoother Averager (FIGS. 5-7)

After obtaining the running inverse, the matrix produces noisy estimates which are smoothed to obtain good estimates of the tap weights $[c_i]$ as illustrated in FIG. 5. A refinement which takes into account the accuracy of each individual estimate is depicted in FIG. 6.

The reasoning behind this refinement is described next.

As indicated above, the present invention performs an inverse of a binary matrix, and updates this inverse $R_n^{-1}$ at the chip rate. The "tap weights" [c] which are used to form the phase shifted sequence were then estimated every chip time by forming the matrix vector product $[c] = R_n^{-1}[d],$ (12)

where the data [d] is noisy. In the originally proposed system of FIG. 4, the separate estimates of the tap weights [c] were averaged together by means of up/down counters. The time varying accuracy of each estimate was not taken into account. It has been proven that a very good estimate of the accuracy is available by just counting the number of "ones" or "zeroes" which are in any row of $R_n^{-1}$. Ideally, the accumulators which are combining the extimates of the tap $c_j$ should contain a number $\lambda_j$ proportional to the log liklihood ratio:

$$\lambda = \ln \frac{\text{PROB}(c_j = 1)}{\text{PROB}(c_j = 0)} \quad (13)$$

where these probabilities are conditioned on all observations. Now, since all the estimates are independent every chip time, the log likelihood ratios add. To see the weighting as a function of the number of ones, q (in say, the $j^{th}$ row of $R_n^{-1}$ at any chip time), one needs only to compute the probability of correctly adding mod 2, q noisy data bits. Let p be the raw data bit error rate, then the addition will be correct if no errors are made, or an even number of errors. The probability of correct computations $P_1$ is easily proved to be:

$$P_1 = \frac{1 + (1 - 2p)^q}{2} \quad (14)$$

and the probability of error is:

$$1 - P_1 = \frac{1 - (1 - 2p)^q}{2} \quad (15)$$

the log likelihood ratio for this observation:

$$\lambda = \ln \frac{P_1}{1 - P_1} = 2(1 - 2p)^q \quad (16)$$

The approximation on the RHS of (16) is valid for small 1-2p or for heavy noise.

This says the decrement or increment of the $j^{th}$ accumulator should decay exponentially with the number of ones in the $j^{th}$ row of the inverse matrix. Now to compute the advantage of the system of FIG. 5 against the old, the following information-theoretic argument is used.

Assume that the operations on the noisy data can be regarded as communications channel. At each chip time, transinformation is obtained about the taps $[c_j]$. As a good approximation to acquisition time in bits, the reciprocal of the average transinformation obtained per chip can be used.

The classic formula for transinformation reads:

$I = 1 + P_1 \log_2 P_1 + (1 - P_1) \log_2 (1 - P_1)$ where $P_1$ is the probability of correct computations. We are going to be dealing with heavy noise so let $P_1 = (1 + \delta)/2$ for small $\delta$ and substitute into (17) to get $I = 1 + (1 + \delta/2) \log_2 (1 + \delta/2) + (1 - \delta/2) \log_2 (1 - \delta/2)$ (19)

Now using $\log_2(1+\delta) = \delta/\ln 2$ we obtain $$I = \delta\left[\left(\frac{1+\delta}{2}\right) - \left(\frac{1-\delta}{2}\right)\right]/\ln 2 \quad (20)$$

$$= \delta^2/\ln 2 \quad (21)$$

For the system of FIG. 5, $\delta = (1-2p)^q$ where q is the number of terms required to add to get the estimate of $c_j$. Substituting this expression in (21), there is obtained:

$$I(q) = (1-2p)^{2q}/\ln 2 \quad (22)$$

But q of n bits in the inverse matrix is binomially distributed with the all zeroes case excluded. Therefore, one can write:

$$H = \frac{1}{(2^n - 1)\ln 2} \sum_{q=1}^{n} \frac{(1-2p)^{2q}n!}{(n-q)!q!} \quad (23)$$

for the average transinformation in the new system. $1/H$ is the estimated acquisition time. For the prior system, an average probability $P_1$ of error for transinformation is used since the computations were not weighted according to their probability of being correct. To calculate $P_1$, one needs only to convolve $P_1$ of equation (14) with the modified binomial distribution to get:

$$P_1 = \frac{1}{2^n - 1} \sum_{q=1}^{n} \frac{(1 + (1-2p)^q)n!}{2(n-q)!q!} \quad (24)$$

and using equation (21) and noting that $\delta^2 = (1/2 - P_1)^2$ the transformation is approximately:

$$H = \frac{1}{4n^2}\left[1 - \frac{n!}{2^n - 1} \sum_{q=1}^{n} (1 + (1-2P)^q)/q!(n-q)!\right]^2 \quad (25)$$

A comparison of acquisition times as a function of n and SNR converted via Gaussian densities to raw bit error probability p is plotted in FIG. 7.

(5) Factorable Generators

Another concern in determining the phase of noisy PN sequences is what to do about factorable generators such as the Gold Code and the $1+x^2$ factor of ambiguously detected QPSK.

At first it was believed that one could use the ordinary system and ignore the fact that the generator polynomials are factorable, but such is not the case.

For example, assume that the PN sequence is received through a QPSK demodulator. The following four possible effects results:
 (1) every bit can be received unaltered;
 (2) every other bit can be inverted;
 (3) every other bit can be inverted in opposite phase to (2); and
 (4) all bits can be inverted.

If the original sequence $S(x)$ satisfies the recursion equation $$S(x)P_n(x) = 0 \bmod x^{2^n} - 1 \quad (26)$$

then any of the ambiguously received sequences $S^*$ will satisfy $$S^*(x)(1+x^2)P_n(x) = 0 \bmod x^{2^n} - 1 \quad (27)$$

This fact can be seen since the sum of the individual sequences which satisfy (26) also satisfy (26) and $$S(x)P_n(x) = 0 \quad (28)$$

while the sequences $$\begin{array}{l} 1\ 1\ 1\ 1\ 1\ 1\ \ldots \\ 1\ 0\ 1\ 0\ 1\ 0\ \ldots \\ 0\ 1\ 0\ 1\ 0\ 1\ \ldots \\ 0\ 0\ 0\ 0\ 0\ 0\ \ldots \end{array} \quad (29)$$

are all zero factors of $1-x^2$.

If one were to blindly multiply the $(1+x^2)P_n(x)$ in equation (27) and attempt to use the simplest of the invention to solve for the "phase vector", not every sequence could be derived from mod 2 sums of delayed versions of any other sequences. Instead, we have to adjoin two systems together (one for each factor). The Gold Codes and the generalizations thereof are also formed by summing a few independent linear PN sequences. Consequently, the generator polynomial can be expressed as a product of irreducable* (usually also primitive) polynomials.

*If factors are repeated such as $1+X^2 = (1+X)(1+X)$ they must be treated as a single factor For concreteness, consider the generating polys as being composed of two factors ($P_A(x)$ and $P_B(x)$). The free running shift register at the receiver will now be replaced by two separate registers whose lengths are equal to the degrees of $P_A$ and $P_B$. It is linear sums of both register outputs (mod 2) that will reproduce any phase of the composite sequence. The matrix equations are partitions in the form:

$$\begin{bmatrix} A & B \\ A^* & B^* \end{bmatrix} \begin{bmatrix} C_A \\ C_B \end{bmatrix} = [d] \quad (30)$$

where A and B represent successive entries in the shift registers which implement $P_Z$ and $P_B$ just as in applicant's prior development.

$A^*$ and $B^*$ represent entries in the registers which are observed after further shifting operations. The matrix on the left hand side of equation (30) is partioned in such a manner that A is square and $B^*$ is square. Remember than at any time, applicant's matrix equation could be described by just multiplying by a very simple column operator shift matrix. This situation is stil true. For all time k:

$$\begin{bmatrix} A(k) & B(k) \\ A^*(k) & B^*(k) \end{bmatrix} = \begin{bmatrix} A_o & B_o \\ A^*_o & B^*_o \end{bmatrix} \begin{bmatrix} S_A & 0 \\ 0 & S_B \end{bmatrix} \quad (31)$$

where the $S_A$ and $S_B$ are exactly as before and take the form:

$$S_A = \begin{bmatrix} x_1 & 1 & 0 & . & 0 \\ x_2 & 0 & 1 & 0 & . \\ . & . & 0 & 1 & 0 \\ . & . & . & 0 & 1 \\ 1 & 0 & 0 & ... & 0 \end{bmatrix}^k \quad (32)$$

the inverses are the same as before and are uncoupled row operations $$S^{-1} = \begin{bmatrix} S_A^{-1} & 0 \\ 0 & S_B^{-1} \end{bmatrix} \quad (33)$$

Consequently, the inverse can be implemented almost identically as in applicant's prior system except the initial value is coupled and must be computed off line. For this system, a variable length "column" shift register in the inverse must be constructed where length is equal to the degree of the factors.

To find the initial inverses equations like $$\begin{bmatrix} A & B \\ A^* & B^* \end{bmatrix} \begin{bmatrix} W & X \\ Y & Z \end{bmatrix} = \begin{bmatrix} I & 0 \\ 0 & I \end{bmatrix} \quad (34)$$

are solved for W, X, Y, and Z.

For example, consider the two equations for W and Y $$AW + BY = I \quad (35)$$

$$A^*W + B^*Y = O \quad (36)$$

Since both A and B* have inverses, their equations, can be solved by substituting (36) into (35):

$$AW - BB^{*-1}A^*W = I \quad (37)$$

or $$W = (A - BB^{*-1}A^*)^{-1} \quad (38)$$

and $$Y = -B^{*-1}A^*(A - BB^{*-1}A^*)^{-1} \quad (39)$$

(6) Extraction of PN Sequence with Data Modulation (FIG. 8)

In accordance with another important feature of the invention, with regard to the extractor of the PN sequence with data modulation, in the prior art it was known to remove the modulation by adding successive bits, which has the drawback that the addition mod 2 has a penalty in noise, together with the nuisance of finding the multiplicative inverse of $(1+X)$ to recreate the correct phase of the PN sequence. This inverse is required to undo the operation of successive addition.

For this special case, the initial loading of the inverse matrix is given in closed form.

If a PN sequence $S(X)$ satisfies $S(X)P(X) = 0$ mod $X^{2n} - 1$ then the sequence $S(X)$ or its complement $\bar{S}(X)$ satisfies $S(X)(1+X)P(X) = 0$ mod $X^{2n} - 1$.

Since the sequence $Q(X) = 1\ 1\ 1\ 1\ 1\ 1$ satisfies $Q(X)(1+X) = 0$:

$$(1+X)P(X)\{Q(X) + S(X)\} = (1+X)P(X)\bar{S}(X) \quad (40)$$

The distributive law still holds in polynomial rings.

While it may appear necessary to add the incoming data bits first, such is not the case, since the sequence is reconstituted without the operator $(1+X)$ and stripped of the modulation.

The phase vector for the data modulated sequence is used exactly in the same way as the ordinary system.

The overall polynomial factors into $P(X)\ (1+X)$. Recall that the free running generators are segmented into separate generators for each factor, linear sums of the generator registers are taken to form the reconstituted sequence.

The generator for $P(X)$ has the same Structure as the generator for the original sequence. The generator for $(1+X)$ is the simple constant "1". It is not surprising then that any phase of the true or the complement can be constructed as depicted in FIG. 8. However, since it is not desired to reconstitute the complement sequence, the constant output is never used in the sum. It is clear that if closing the switch of the constant would create the complement sequence with the proper phase, the same tap weights without the constant would create the same phase of the true sequence.

Even though the constant's output is not used to form the proper phase, to solve for the tap weights $[c_i]$ it is necessary to solve a system of equations with one more dimension.

The system of equations can b partioned in the following matrix:

$$\left( \begin{array}{c|c} & 1 \\ R & \vdots \\ & 1 \\ \hline r^T & 1 \end{array} \right) \begin{bmatrix} c_i \\ \vdots \\ c_{n+1} \end{bmatrix} = \begin{bmatrix} d_1 \\ \vdots \\ d_{n+1} \end{bmatrix} \quad (41)$$

R is the square matrix of shift register entries of the free running shift register. $r^T$ is the vector of shift register entries which occur one shift after the bottom row of R. $c_1$ through $c_n$ are the tap weights on the main register. $c_{n+1}$ is the tap weight (unused) for the constant term and the d's are the noisy observed data bits. The column vector of all ones reflects the fact that the constant term never changes.

Consideration is now given as to how these systems of equations are solved for all time and initially.

There is virtually no difference in the inverse matrix shifting operation between the data modulated system and applicant's original system.

Assume that the shifting matrix for the matrix left hand side of equations (41) partotion off into $$S = \begin{bmatrix} x_1 & 1 & 0 & - & 0 & 0 \\ x_2 & 0 & 1 & 0 & 0 & 0 \\ . & & 0 & . & & 0 \\ . & & . & . & 0 & \\ x_{n-1} & & & & 1 & . \\ 1 & 0 & . & . & 0 & 0 \\ 0 & 0 & . & . & 0 & 1 \end{bmatrix} \quad (42)$$

The matrix post multiplicatoin of equation (41) is blocked by S, whereupon the matrix $R_1$ and the vector $r^T$ of equation (41) are indeed shifted while the "ones" column is left alone.

The inverse is also decoupled and reads.

$$S^{-1} = \begin{bmatrix} 0. & 0\,1 & & & & 0 \\ 1\,0 & & x_1 & & & 0 \\ 0\,1 & & x_2 & & & 0 \\ . & & & & & 0 \\ & & 0. & & & 0 \\ 0\,0 & . & 1 & x_n & & 0 \\ \hline 0\,0 & .. & 0\,0 & & & 1 \end{bmatrix} \quad (43)$$

The tap weight estimates are given at any time k by $$[C(K)] = (S^{-1})^k 12^{-1}[d(k)] \quad (44)$$

Where $S^{-1}$ is a row operator and is implemented with column shift registers exactly as before with (n+1) columns and n rows, the n+1st row is invariant and in the present case is not even used.

Consideration is now given to calculating $R_o^{-1}$.

The calculation of an initial inverse is done in closed form.

Recall that in the original system, a special state of the free running generator was decoded which corresponded to an upper triangular matrix Z $$Z = \begin{bmatrix} 1 & x & x & x \\ 0 & 1 & & x \\ 0 & 0 & . & x \\ & & & x \\ 0 & 0 & 0 & 1 \end{bmatrix} \quad (45)$$

and recall that the inverse, $Z^{-1}$ was simply expressed in terms of the coefficients xj of the generator polynomial.

$$Z^{-1} = \begin{bmatrix} 1 & x_{n-1} & . & & .x_1 \\ 0 & 1 & x_{n-1} & . & x_2 \\ . & 0 & . & & . \\ . & . & & & .x_{n-1} \\ 0 & 0 & & . & 1 \end{bmatrix} \quad (46)$$

The initial inverse of the extended matrix of equation (41) is a little more complicated but will be expresseable in terms of $Z^{-1}$ and other vectors involving {xj}.

The presence of Z was detected (or decoded) by decoding (0 0 ... 0 1) in the free running generator register. The same is done here, thereby producing the initial matrix $R_o$, $$R_0 = \begin{bmatrix} & & & 1 \\ & Z & & . \\ & & & 1 \\ \hline 1\,0 & ... & 0 & 1 \end{bmatrix} \quad (47)$$

The row vector below Z, (1 0 ... ), called $\mu^T$ and is known priori to be the next vector called (0 0 ... 0 1) to be shifted into the generator register.

The constant all ones vector in the upper right hand corner is called "u". The single one in the lower right hand corner is called "d".

The initial inverse matrix is similarly partitioned and is defined $$R_o^{-1} = \left[ \begin{array}{c|c} A & e \\ \hline f^T & g \end{array} \right] \quad (48)$$

Block multiplying $R_o R_o^{-1}$ gives the following equations $$ZA + uf^T = I \quad (49)$$

$$\mu^T A + f_0^T = 0^T \quad (50)$$

$$Ze + ug = 0 \quad (51)$$

$$\mu^T e + g = 1 \quad (52)$$

where I is the appropriate indentity matrix and $0^T$ is the zero row vector.

Substituting (50) into (49) yields:

$$(z + u\mu^T)A = 1 \quad (53)$$

where the outer product $u\mu^T$ is a matrix of the form $$v\mu^T = \begin{bmatrix} 1\,0\,0 & .. & 0 \\ 1\,0\,0 & .. & 0 \\ . \\ . \\ 1\,0\,0 & .. & 0 \end{bmatrix} \quad (54)$$

A can be expressed:

$$A = Z^{-1}(I + v\omega^T) \quad (55)$$

where $$\omega^T = (1, X_{n-1}, X_{n-2} \ldots X_1) \quad (56)$$

This expression was originally derived by assuming A in the form $Z^{-1}B$ and then doing several row operations to find B.

Substituting (55) into (53) we have:

$$(Z + v\mu^T)Z^{-1}(I + v\omega^T) = (I + v\omega^T Z^{-1})(I + v\omega^T) = I + v\mu^T Z^{-1} = v\omega^T + v\mu^T Z^{-1} v\omega^T \quad (57)$$

The factor of $v$ in the last three terms on the RHS of (18) adds to zero. Explicitly for the first two of the last three:

$$u^T Z^{-1} + \omega^T = (1\,0 \ldots 0) \begin{pmatrix} 1 & x_{n-1} & . & & .x_1 \\ 0 & 1 & x_{n-1} & . & x_2 \\ . & & . & & .. \\ . & & & & x_{n-1} \\ 0 & & & & 1 \end{pmatrix} + (1, x_{n-1} \ldots x_1) \quad (58)$$

$$= (1, x_{n-1} \ldots x_1) + (1, x_{n-1} \ldots x_1) = 0 \quad (59)$$

now for the third term $$u^T Z^{-1} v\omega^T = (1, x_{n-1} \ldots x_1) \begin{pmatrix} 1\,x_{n-1} \ldots x_1 \\ 1\,x_{n-1} \ldots x_1 \\ . & . \\ . & . \\ 1\,x_{n-1} \ldots x_1 \end{pmatrix} \quad (60)$$

$$-\text{continued}$$
$$= (1 + \Sigma X_i, 0 \ldots 0) \tag{61}$$

An irreducably poly P(X) must have $1+\Sigma x_i = 0$ or else $(1+X)$ would factor it, therefore (55) is established.

The rest of the terms for the inverse $R_o^{-1}$ are relatively easily obtained. From (50) and using (58):

$$f^T = \mu^T A = \omega^T (I + v\omega^T) \tag{62}$$

$$= (1\ x_{n-1} \ldots x_1) + (1, x_{n-1} \ldots x_1) \begin{pmatrix} 1\ x_{n-1} \ldots x_1 \\ 1\ x_{n-1} \quad x_1 \\ \cdot \cdot \quad \cdot \\ \cdot \cdot \quad \cdot \\ \cdot \cdot \quad \cdot \\ 1\ x_{n-1} \quad x_1 \end{pmatrix} \tag{63}$$

The second term on the right hand side of (63) is zero, since $$1 + \sum_{1}^{n-1} x_j = 0,$$

or simply $$f^T = (1, x_{n-1} \ldots x_1) \tag{64}$$

Now from (51), it is apparent $$e = g\ Z^{-1}, g \text{ a scalar} \tag{65}$$

substituting into (52)

$$g\ (\mu^T Z^{-1} u + 1) = 1 \tag{66}$$

whereby, $\mu^T Z^{-1} u = 1 + \Sigma X_i = 0$ so $g = 1$ and $$e = Z^{-1} = \begin{bmatrix} 0 \\ \alpha_2 \\ \cdot \\ \cdot \\ \cdot \\ \alpha_{n-1} \\ 1 \end{bmatrix} \tag{67}$$

where $\alpha_j = 1 + \sum_{j}^{n-1} X_j = \sum_{1}^{j-1} X_j$

The expression A in (55) can also be written in terms of these ='s or e, whereby $$A = A^{-1} + ([e], [x_{n-1}e] \ldots [x_1 e]) \tag{68}$$

where $[x_j e]$ are column vectors. These explicit expressions (64, 65, 67, 68 and $g=1$) are used to implement initial loading.

Figure 9:
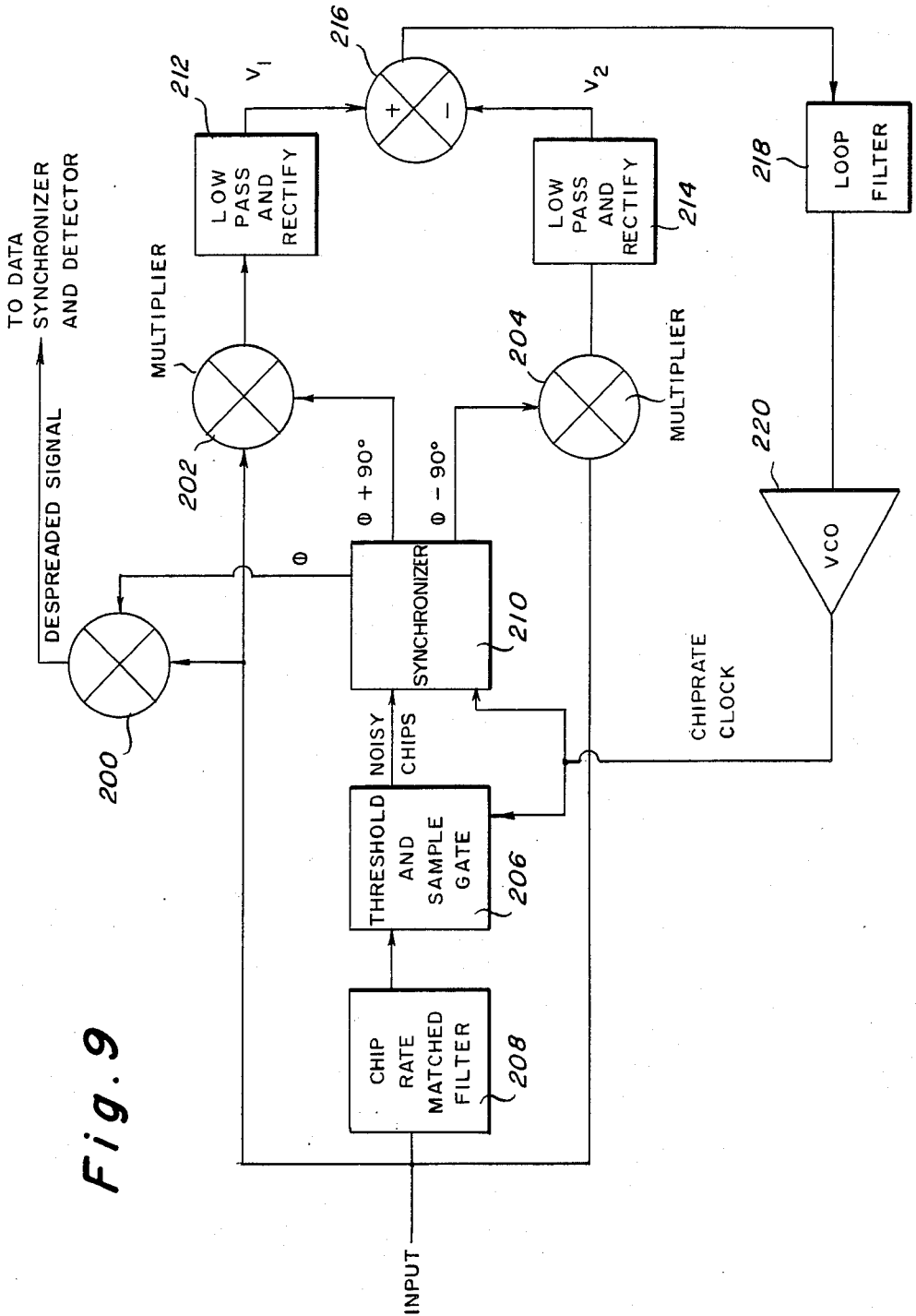
FIG. 9 is a circuit diagram illustrating another embodiment of the invention for synchronizing the PN sequence in a phase locked loop.

(7) Further Modification (FIGS. 9 and 10)

According to another embodiment, a similar result may be obtained without having to search through the PN phase. By simple modification, there may be obtained a half bit advanced sequence and a half bit retarded sequence as well as the in-phase sequence. As shown by the circuit illustrated in FIG. 9, the input to the phase locked loop controller is despreaded.

In FIG. 10, the signals $V_1$ and $V_2$ are sketched as a function of chip clock phase.

In accordance with one important advantage, it is not necessary to slew over all the possible PN phases, because the PN synchronizer of the present invention calculates the appropriate despreading sequence regardless of the relative phase. This fact allows a much tighter loop. Note that the only thing that has to operate in a heavy noise environment is the PN synchronizer which works at $-40$ db SNR.

In FIG. 10, the signals $V_1$ and $V_2$ of FIG. 9 are sketched as a function of chip clock phase. More particularly, the input signal is supplied to the input terminals of multipliers 200, 202 and 204, and is applied to the threshold and sample gate 206 via chip rate matched filter. The noisy chips are supplied to the synchronizer 208 (which corresponds with the synchronizer of FIG. 1), which supplies the error-free properly phased PN sequenced to the multiplier 200, and the phase $+180°$ and phase $-180°$ signals to the multipliers 202 and 204, respectively. As known in the art of "delay lock" tracking loops, the phase shifted signals are supplied to low-pass filter and rectifiers 212 and 214 to produce the signals $V_1$ and $V_2$, respectively, that are fed to the inputs of The mod 2 adder 216. The output from adder 216 is filtered by the loop filter 218 and is applied to the voltage controlled oscillator the chip rate clock signal to the threshold and sample gate 206 and to the synchronizer 208. The despread signal from multiplier 200 is supplied to conventional data synchronizing and detecting means. The composite control signal $(V_1 - V_2)$ has stable points as shown in FIG. 10, and consequently it is not necessary to slew the sequence to any particular phase, since phase may always be recomputed algebraically.

Referring again to FIG. 1, for ranging operation, the phase vector is converted by the phase delay means 130 to actual phase difference via either a table look-up of standard algebraic calculation in a Galois field. Thus, a polynomial summation of $c_j X_j$ is converted to a simple power:

$$X^q \text{ Mod (generator polynomial)}$$

Figure 12:
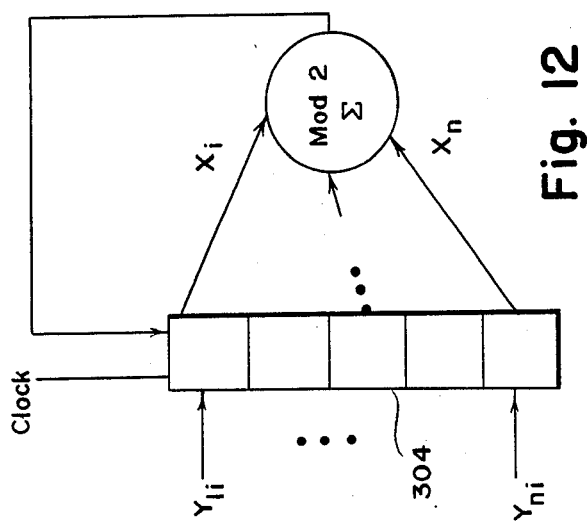
FIG. 12 illustrates a corresponding modification of the running inverse means.
Figure 11:
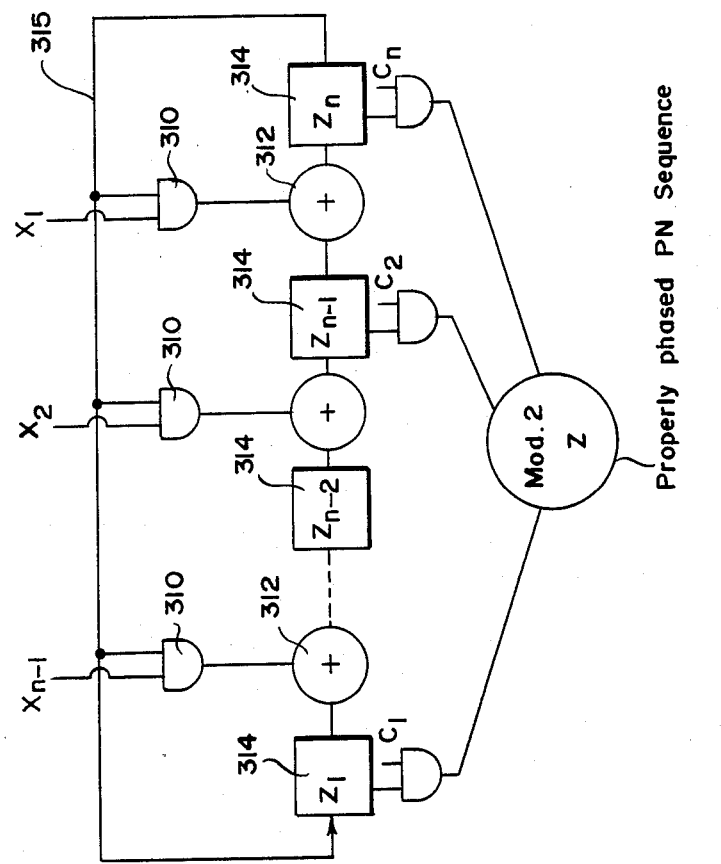
FIG. 11 is a diagrammatic illustration of another embodiment of the resident PN generator means of FIG. 1.
Figure 13:
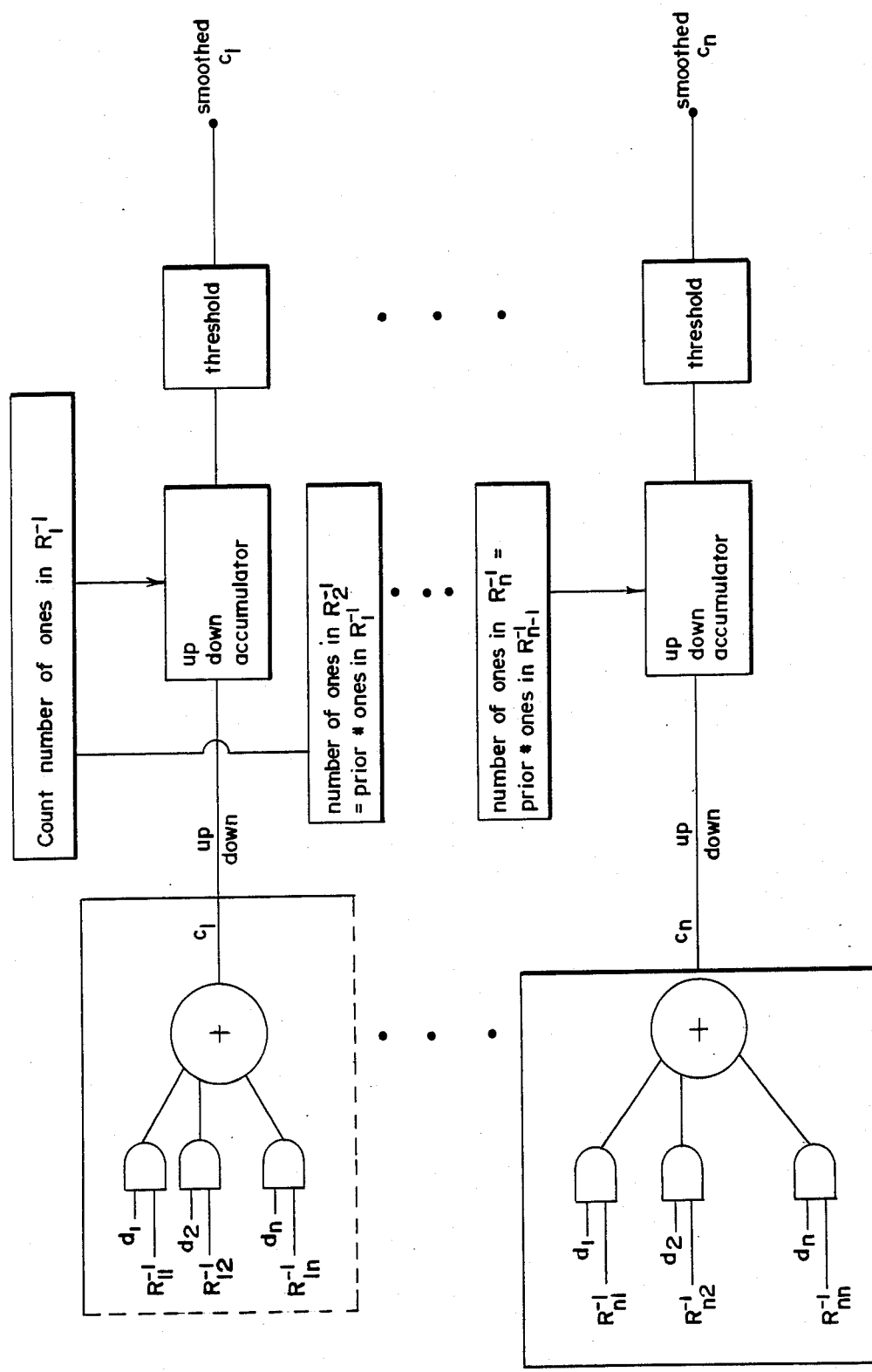
FIG. 13 is a diagrammatic illustration of the structure of the row weight enumerator of the system of FIGS. 11 and 12.

In the embodiment of FIGS. 1–10 described above, the resident generator of FIG. 2 uses a shift register the output stages of which are connected with a mod 2 adder, and the columns of an inverse matrix were implemented with the generalized and much more complicated shift register of FIG. 3. As shown in the modification of FIGS. 11–13, the roles of these shift registers may be reversed by constructing one generalized shift register for the "resident generator" and many ordinary shift registers for the inverse matrix. This fact affords not only a considerable simplification in implementation of the inverse matrix but also yields a considerable simplification in the devices which measure the number of ones in the rows of the inverse matrix. Furthermore the initial inverse matricies are easier to compute with this alternate method. As shown in FIGS. 11–13, the resident PN generator means includes a plurality of D stage registers 314 between which are connected a plurality of mod 2 adders, respectively, having inputs connected with the output terminals of a plurality of AND gates 310, respectively. A plurality of known coefficients of recursion $(X_1 \ldots X_{n-1})$ are applied to first inputs to the AND gates, respectively, and the other input terminals of the AND gates are supplied with feedback signals provided by the feedback conductor 315 that connects the output from the last stage $Z_n$ to the first stage $Z_1$ of the resident PN generator. The companion running matrix inverse means of FIG. 12 includes a plurality of columns i, where i=1 ... m. Each of the columns includes a shift register 304, and recursion means connected with the shaft register for producing the next bit depending on the n prior bits, said recursion means having a plurality of known coefficients of recursion ($X_1 \ldots X_{n-1}$). Loaded in parallel to the D stages of each column, respectively, are second signals ($Y_{1i} \ldots Y_{ni}$) that are known a' priori funcitons of the coefficients of recursion, thereby loading the inverse ($R_o^{-1}$).

Consider the generator depicted in FIG. 11. In order to assure that this generator implements the correct sequence, the outputs of the register stages $Z_k$ can be expressed at time "j" as follows:

$$Z_{j,1} = S_{j-1} + Z_{j-1,n} \quad (69)$$
$$Z_{j,2} = Z_{j-1,1} + X_{n-1}S_{j-1} = S_{j-2} + X_{n-1}S_{j-1}$$
$$Z_{j,3} = Z_{j-1,2} + X_{n-2}S_{j-1} = S_{j-3} + X_{n-1}S_{j-2} + X_{n-2}S_{j-1}$$
$$\vdots$$
$$Z_{j,n} = Z_{j-1,n-1} + X_1 S_{j-1} = S_{j-n} + \sum_{k=1}^{n-1} S_{j-k} X_k = S_j$$

which indeed implements the desired recursion equation.

To assure that any phaase of the sequence can be made from a mod 2 sum of the stages of this register, the following "pigeon hole" argument is made:
1. There are $2^n - 1$ distinct phases of the linear PN sequence (assuming a primitive polynomial).
2. There are $2^n - 1$ distinct non trivial combinations of the stages of the register which can be added together.
3. The distinct sums of registers all yield distinct phases or else there would be a combination which would add to zero which in turn would imply a polynomial P(x) degree less than n such that $P(x)S(x)=0 \mod X^{2n}-1$ which is untrue.

It is concluded that indeed there is a one-to-one correspondance between every phase of the PN sequence and some linear sum of the register stages of FIG. 11.

Again, one is trying to find the c's such that $$R[c]=[d] \quad (70)$$

Where R is the matrix formed by n successive operations of the resident generator, d is the incoming chip and c is the phase vector. Just as before, there is a simple matrix post multiplier which describes the shift operation so that for any time "j":

$$R_o S^j [c] = [d]_j \quad (71)$$

with [c] expressed as before $$[c] = S^{-j} R_o^{-1} [d]_j \quad (72)$$

The column shift operator reads $$S = \begin{bmatrix} 0 & 1 & 0 & \cdots & 0 \\ 0 & 0 & 1 & 0 & \cdot \\ 0 & 0 & 0 & \cdot & \cdot \\ & & & \cdot & 1 & 0 \\ 0 & 0 & & \cdots & 0 & 1 \\ 1 & X_{n-1} & \cdots & & X_1 \end{bmatrix} \quad (73)$$

and its inverse is simply $$S^{-1} = \begin{bmatrix} X_{n-1} & X_{n-2} & \cdots & X_1 & 1 \\ 1 & 0 & \cdots & & 0 \\ 0 & 1 & & & \cdot \\ 0 & 0 & & & \cdot \\ \cdot & \cdot & & & \cdot \\ \cdot & \cdot & & & \cdot \\ 0 & 0 & \cdots & 0 & 1 & 0 \end{bmatrix} \quad (74)$$

Each column of the inverse operator in equation (74) is implemented with an ordinary shift register and generator as depicted in FIG. 12.

One advantage of this embodiment is that initial inverses are greatly simplified.

Recall that one needed to decode a state in the resident generator which will allow the loading of an initial inverse into the inverse matrix generators.

The state chosen for decoding is the all-zeroes-and-a-final-one state, 0000001. When this state occurs, the $R_o$ matrix is the indentity. Consequently, the initial inverse is also the identity. The initial inverse for the data modulated case is only slightly less trivial.

For data modulation recall we use the extra factor $(1+x)$ in the generator poly and we need to solve a system of linear equations with one more dimension. The situation is depicted below for the initial matrix $R_o$.

$$\boxed{\text{"1"}} \text{—Constant 1} \quad (75)$$

$$R_o = \begin{bmatrix} 1 & 0 & 0 & \cdots & 0 & 1 \\ 0 & 1 & 0 & \cdots & 0 & 1 \\ 0 & 0 & 1 & & \cdot & 1 \\ 0 & 0 & & 1 & \cdot & 1 \\ \cdot & \cdot & & \cdots & \cdot & 1 \\ \cdot & \cdot & & \cdots & \cdot & 1 \\ 0 & 0 & & 0 & \cdots & 1 & 1 \\ 1 & X_{n-1} & \cdots & & X_1 & 1 \end{bmatrix}$$

The recursion coefficients (1, $x_{n-1}, \ldots x_1$) are dumped into the resident generator after the (0 0 0 ... 0 1) state. To determine the inverse, $R_o$ is partitioned off into the form:

$$R_o = \left[ \begin{array}{c|c} I & 1] \\ \hline a^T & 1 \end{array} \right] \quad (76)$$

and the inverse is written in the same partition:

$$R_o^{-1} \left[ \begin{array}{c|c} A & B] \\ \hline \gamma^T & g \end{array} \right] \quad (77)$$

The equation $R_o R_o^{-1} = I$ yields the following four equations:

$$A + 1]\gamma^T = I \text{ (Square Matrix)} \quad (78)$$

$$a^T A + \gamma^T = 0^T \text{ (Row vector)} \quad (79)$$

$$B] + 1]g = 0] \text{ (Column Vector)} \quad (80)$$

$$a^T B] + g = 1 \text{ (Scalar Equation)} \quad (81)$$

where I is the appropriate indentity matrix, $0^T$ is a row of zeroes, 0] is a column of zeroes, 1] a column of ones and g a scalar.

Substituting (79) into (78), we have:

$$[I+1]\alpha^T]A=I \tag{82}$$

Writing the outer product $1]\alpha^T$ explicitly as $$1]\alpha^T = \begin{bmatrix} 1 \ X_{n-1} \ldots X_1 \\ 1 \ X_{n-1} \ldots X_1 \\ \vdots \\ 1 \ X_{n-1} \ldots X_1 \end{bmatrix} \tag{83}$$

enables us to observe $$(1]\alpha^T)^2 = 0 \tag{84}$$

This fact is true because every term in the matrix square is of the form $X_q$ $$X_q\left(1 + \sum_{1}^{n-1} X_j\right)$$

and there are an even number of non zero coefficients in all irreducable polys (not counting the lowest coefficient).

Therefore, left multiplying (82) by $I+1]\alpha^T$ we have an instant solution for A $$[I + 1]\alpha^T]^2 A \tag{85}$$

$$= (I + 1]\alpha^T + 1]\alpha^T + (1]\alpha^T)^2)A$$

$$= A = I + 1]\alpha^T$$

Using (11) and (12) we have $$g = 1 \tag{86}$$

$$\beta]3 = 1]$$

again relying on $|\alpha^T| = 0$

Since we do not want to reconstitute the complemented sequence we do not need the last row of the inverse matrix, however, for completeness we might note that $$\gamma^T = \alpha^T[I + 1]\alpha^T] \tag{87}$$

$$= \alpha^T$$

The shift operations are, of course, still decoupled and k chips after the initial inverse we have $$R^{-1} = \begin{bmatrix} S^{-1} & 0] \\ \hline 0^T & 1 \end{bmatrix}^k R_o^{-1} \tag{88}$$

$$= \left(\begin{array}{c|c} (S^-)^k & 0] \\ \hline 0^T & 1 \end{array}\right) R_o^{-1}$$

-continued $$= \left[\begin{array}{c|c} S^{-k}A & S^{-k}1] \\ \hline \alpha^T & 1 \end{array}\right]$$

The net effect of the data modulation is that we build one extra column shift register in the inverse and we initialize it with all "1"s.

All other factorable generators can be handled similarly, albeit the initial inverse matricies will be computed off line.

In general factorable generators and inverses are produced of the form $$R^{-1} = \left(\begin{array}{c|c} S_1^{-k} & 0 \\ \hline 0 & S_2^{-k} \end{array}\right) \left(\begin{array}{c|c} A & B \\ \hline C & D \end{array}\right) \tag{89}$$

where A, B, C, D are components of an initial inverse. Equation (89) can be written $$R^{-1} = \left(\begin{array}{c|c} S_1^{-k}A & S_1^{-k}B \\ \hline S_2^{-k}C & S_2^{-k}D \end{array}\right) \tag{89a}$$

which is a natural partition for the column generators.

The initial inverses are constructed from solving equations similar to (78–81).

Finally note that the structure for the row weight enumerator is simplified because the weight can be passed down the rows as depicted in FIG. 13. It is estimated that the hardware for this embodiment will be reduced by about one-half from that of the previous embodiment.

Figure 14:
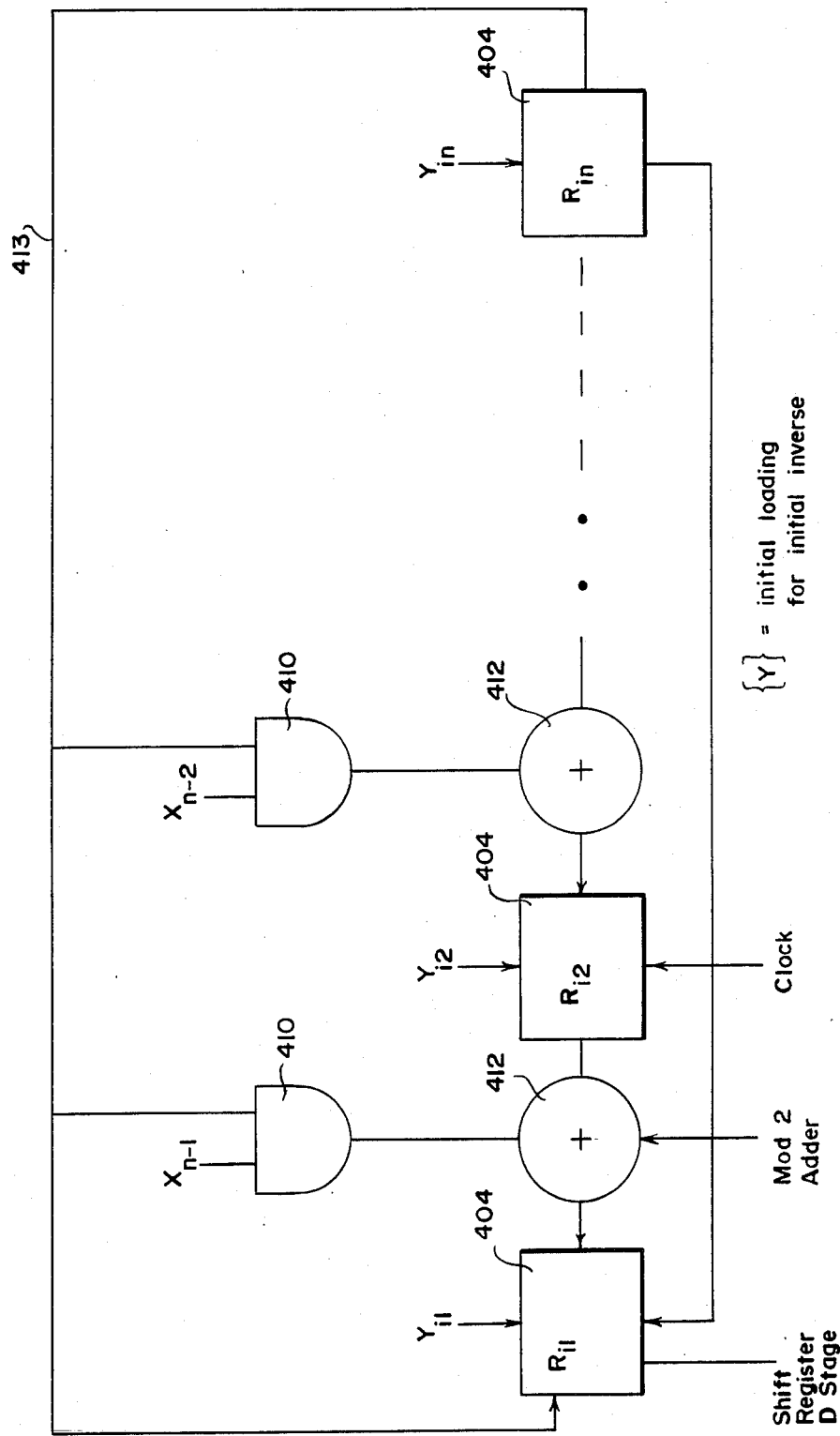
FIG. 14 is a diagrammatic illustration of another modification of the resident PN generator means.

Reference is now made to the modification of FIG. 14, wherein the mod 2 adders 412 are connected between the D-stage shift registers 4D4, a plurality of AND gates 410 being provided having outputs connected with the inputs of the mod 2 adders. The known coefficients of recursion ($X_1 \ldots X_{n-1}$) are applied to one input terminal of the AND gates, respectively, and the other input terminals of the AND gates are supplied with feedback signals provided by a connection 413 between the output of the last D stage and the input of the first D stage of the row. Loaded into the D stages of the registers are second signals ($Y_{i1} \ldots Y_{in}$), respectively, that are a priori functions of the coefficients of recursion, thereby loading the initial inverse ($R_o^{-1}$).

The "exact equivalent" system is formulated from the first system by observing that the prior shift operator on the matrix R was formed by post multiplying by a special matrix S; and that this operation can be replaced by premultiplying by a matrix S* where S* is closely related to S. In fact, we have $$\begin{pmatrix} r_{nj} & r_{n-1} & \cdots & r_1 \\ r_{n+1} & \cdot & \cdots & r_2 \\ \cdot & & & \cdot \\ \cdot & & & \\ r_{2n-1} & & \cdots & r_n \end{pmatrix} S = S^* \begin{pmatrix} r_n & r_{n-1} & \cdots & r_1 \\ r_{n+1} & \cdot & \cdots & r_2 \\ \cdot & & & \cdot \\ \cdot & & & \\ r_{2n-1} \cdot & & \cdots & r_n \end{pmatrix} = \tag{90}$$

-continued $$\begin{pmatrix} r_{n+1} & \cdots & r_2 \\ r_{n+2} & \cdots & r_3 \\ \cdot & & \cdot \\ \cdot & & \cdot \\ r_2 & \cdots & r_{n+1} \end{pmatrix}$$

where $$S = \begin{bmatrix} x_1 & 1 & 0 & \cdots & \\ x_2 & 0 & 1 & 0 & \cdots & 0 \\ \cdot & & \cdot & 0 & 1 & \cdot \\ \cdot & & & & 0 & \cdot & 0 \\ x_{n-1} & & & & & 1 \\ 1 & 0 & \cdots & & & 0 \end{bmatrix} \quad (91)$$

and $$S^* = \begin{bmatrix} 0 & 1 & & 0 & \cdots & 0 \\ \cdot & 0 & & 1 & 0 & \cdot \\ \cdot & \cdot & & 0 & \cdot & \cdot \\ 0 & \cdot & & & & 0 \\ 0 & 0 & & \cdots & 0 & 1 \\ 1 & x_{n-1} & & \cdots & x_2 & x_1 \end{bmatrix} \quad (92)$$

If the shifts had been defined to the left, then $S^*$ would have been the transpose of $S$. The net result is that our running inverse matrix can be expressed:

$$R^{-1} = R_o^{-1} (S^{*-1})^k \quad (93)$$

Thus, the running inverse is obtained for each chip time by post multiplying by a simple inverse (where before it was premultiplied), thereby giving:

$$S^{*-1} = \begin{bmatrix} x_{n-1} & x_{n-2} & \cdots & x_1 & 1 \\ 1 & 0 & & & 0 \\ 0 & 1 & 0 & & \cdot \\ \cdot & 0 & 1 & \cdot & \cdot \\ \cdot & & \cdot & \cdot & \cdot \\ 0 & 0 & \cdots & 0 & 1 & 0 \end{bmatrix} \quad (94)$$

The running inverse is therefore implemented with row shift as in FIG. 1 registers instead of columns.

Everything else remains the same, the initial $R_o^{-1}$ is placed in the same stages as before. The up/down counters/accumulators are the same for this equivalent system.

Figure 15:
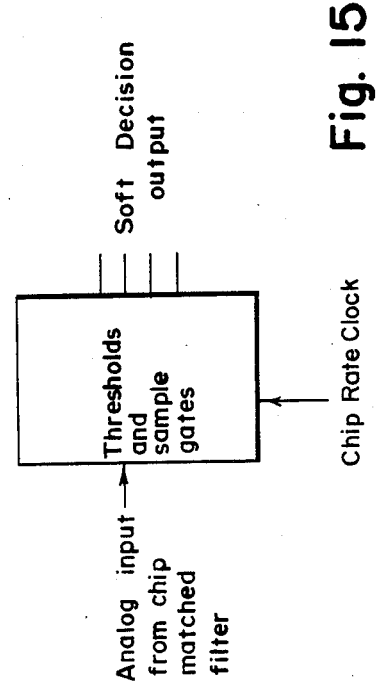
FIGS. 15 and 16 are diagrammatic illustrations of the system for utilizing soft decisions on the noisy chips.
Figure 16:
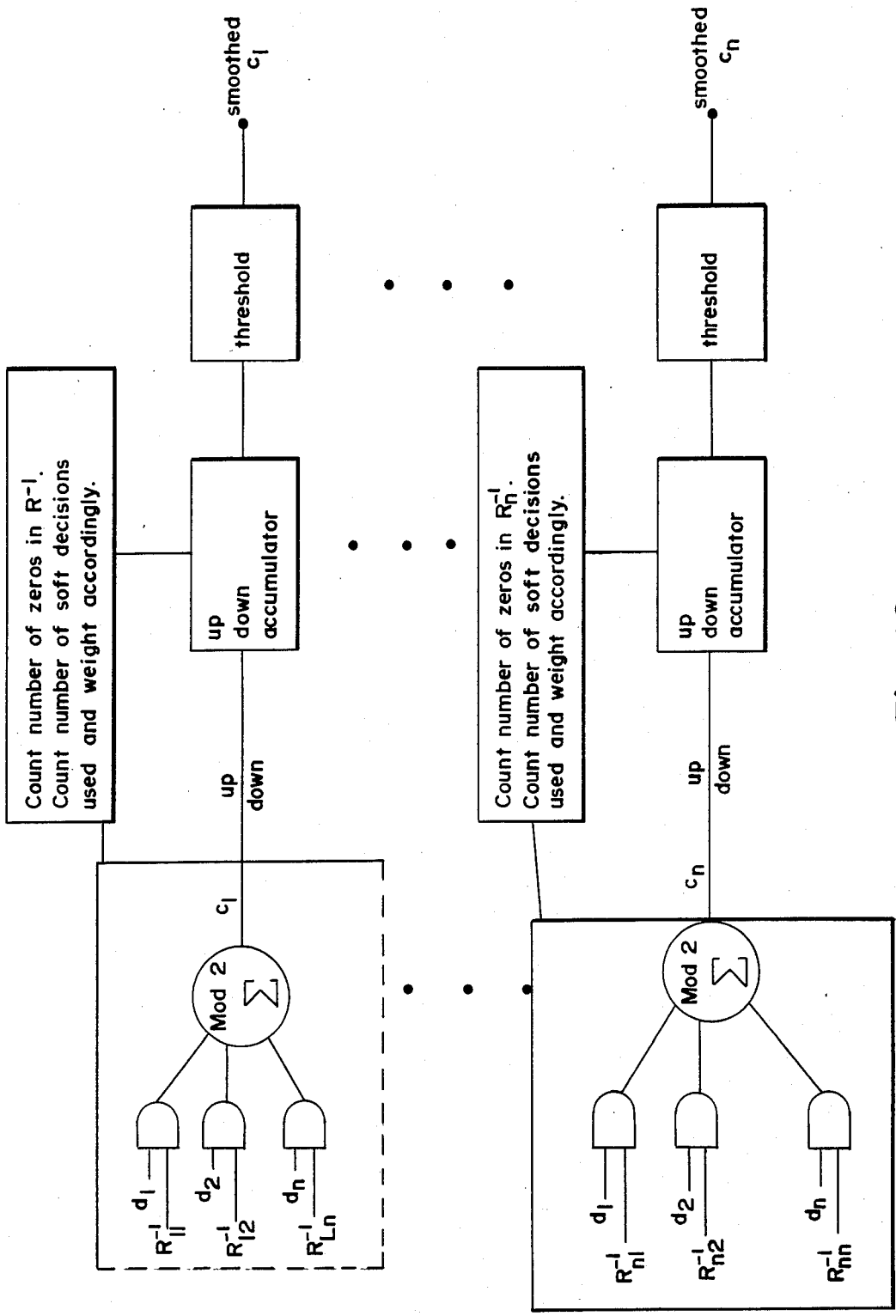

Referring now to FIG. 15, more information about the correct phase vector may be obtained if one utilizes soft decisions on the noisy chip inputs. Soft decisions are obtained by making multiple thresholds and thereby deciding not only whether the input data is thought to be a one or a zero, but also how certain. It turns out that most of the available information is obtained with only two or three bits of soft decisions. A mathematical treatment follows. The soft decision modifies how much up data of the accumulations in the $\phi$ vector smoothing operation depicted in FIG. 16 is achieved.

For the phase vector, log likelihood ratios are accumulated for each component. Every chip time a certain amount of information is obtained about each component. Each component of the phase vector requires one bit of information to determine whether it is a "one" or a "zero". Therefore, as an estimate of acquisition time in number of chips, the reciprocal of average transinformation about the component of the phase vector is used.

This estimate will be reasonably accurate as long as log likelihood ratios, $\lambda_i$, are accumulated about each decision (each component).

To calculate the estimates of the phase vector component, we add mod 2, certain of the incoming chips. The amount by which the $\lambda_i$ is updated is a function of the number of terms added together, and the certainty of the decision on each chip in the mod 2 sum. It turns out that the log likelihood ratios and the transinformation are relatively easily tractable in terms of the individual chip measurements.

In all cases of interest it is assumed that we are receiving chips in heavy noise, hence the probabilities of receiving them correctly $p_i$ deviates slightly from 0.5, and there is used the definition $$p_i = 0.5 + \epsilon_i \quad (95)$$

In heavy noise the transinformation about any component of the phase vector is approximated by $2\epsilon^2 \log_2 l$, where $\epsilon$ is defined above.

The transinformation about any component $\phi_i$ of the phase vector is expressed at $$I_{xy} = 1 + (1-p) \log_2 (1-p) + p \log_2 p \quad (96)$$

where $p = 0.5 + \epsilon$ is the probability of correct computation. Writing (96) in terms of $\epsilon$:

$$I_{xy} = 1 + (.5 - \epsilon) \log_2 \left( \frac{1 - 2\epsilon}{2} \right) + (.5 + \epsilon) \log_2 \left( \frac{1 + 2\epsilon}{2} \right) \quad (97)$$

$$\simeq .5 \log_2 (1 - 4\epsilon^2) + \epsilon \log_2 \left( \frac{1 + 2\epsilon}{1 - 2\epsilon} \right) \quad (98)$$

Using $\log_2(1+x) \approx 2\epsilon^2 \log_2 l$ for small x, (97) and (98) simplify to $$I_{xy} \approx 2\epsilon^2 \log_2 l \text{(bits)} \quad (99)$$

Suppose a particular component of the phase $\phi_q$ is expressed as vector $\phi_q = \Sigma y_i$ where $y_i$ are individual chips; then after appropriate scaling, the scaled transinformation is the product of the individually scaled transinformation.

One needs only prove the above statement for the mod 2 sum of any two variables, then induction will provide it for all mod 2 sums.

The probability of error, q, in computation of the mod 2 sum of two variables $y_1$ and $y_2$ is given by $$q = q_1 + q_2 - 2 q_1 q_2 \quad (100)$$

where $q_1$ and $q_2$ are the individual probability of errors of $x_1$ and $x_2$. Using $q = 0.5 - \epsilon$ we have $$0.5 - \epsilon = 1 - \epsilon_1 - \epsilon_2 - 2(0.5 - \epsilon_1)(0.5 - \epsilon_2) \quad (101)$$

$$\epsilon = 2\epsilon_1 \epsilon_2 \quad (102)$$

$$4\epsilon^2 = (4\epsilon_1^2)(4\epsilon_2^2) \quad (103)$$

In general $$4\epsilon^2 = \pi(4\epsilon_r^2) \tag{104}$$

$$4\epsilon^2 = (2/\log_2 l)H_{xy} \text{ (bits)} \tag{105}$$

the factor $2/\log_2 l$ is the scaling factor.

This product formula (104) allows one to calculate the overall transinformation in terms of the transinformation on each chip, and one will be able to calculate the efficacy of soft decisions.

For hard decisions in heavy noise, for the chips, the transinformation in each chip is nearly $(\rho/\pi) \log_2 l$.

The classic formula for transinformation given a hard decision D reads $$I(x/D) = 1 + p(1/D) \log_2 (1/D) + p(0/D) \log_2 p(0/D) \tag{106}$$

where $$p(O/D) = \frac{1}{\sqrt{2\pi}} \int_{\sqrt{\rho}}^{\infty} \exp(-x^2/2) dx \tag{107}$$

Here Gaussian noise and symmetric signals are assumed. Now if p(O/d) is regarded as an error probability, $\epsilon = 0.5 - p(O/D)$ or $$\epsilon = \frac{1}{\sqrt{2\pi}} \int^{\sqrt{\rho}} \exp(-x^2/2) dx \tag{108}$$

and our transinfomration is simply $$2\epsilon^2 \log_2 l + \frac{\log_2 l}{\pi} \left[ \int_0^{\sqrt{\rho}} \exp(-x^2/2) dx \right]^2 \tag{109}$$

asymptotically, heavy noise $\rho << 1, 2^{1-x^2/2}$ is constant and (109) reduces to $$2\epsilon^2 \log_2 l = (\rho/\pi) \log_2 l \tag{110}$$

where $\rho$ is SNR in power.

For soft decision with enough resolution the transformation on each chip is nearly $(\rho/2) \log_2 l$ or a factor of $\pi/2$ better than hard decisions.

The transinformation at the receiver after measuring x volts is the classic equation $$I(y/x) = 1 + p(1/x) \log p(1/x) + p(0/x) \log p(o/x) \tag{111}$$

Now by using Bayes rules $$p(1/x) = \frac{p(x/1)p_o(1)}{p_o(x)} \tag{112}$$

or, using symmetry $$p(1/x) = \frac{p(x/1)}{p(x/1) + p(x/o)} \tag{113}$$

$$= \frac{\exp(\sqrt{\rho} (x))}{\exp(\sqrt{\rho} (x)) + \exp(-\sqrt{\rho} (x))} \tag{114}$$

$$p(0/x) = \frac{\exp(-\sqrt{\rho} (x))}{\exp(\sqrt{\rho} (x)) + \exp(-\sqrt{\rho} (x))} \tag{115}$$

Substituting (114) and (115) into (111) nets the equation, after a little arithmetic $$I(y/x) = \log_2 l \{ \sqrt{\rho x} \tanh(\sqrt{\rho x}) - \ln \cosh(\sqrt{\rho x}) \} \tag{116}$$

Now in order to calculate the average transinformation the average of I(y/x) over $p_o(x)$ is needed. Thus, $$H(y/x) = \frac{\log_2 l}{\sqrt{2\pi}} \int_{-\infty}^{\infty} \left[ \frac{\exp\left(\frac{x - \sqrt{\rho}}{\sqrt{2}}\right)^2 + \exp-\left(\frac{x + \sqrt{\rho}}{\sqrt{2}}\right)^2}{2} \right] I(y/x) dx \tag{117}$$

$$= (\log_2 l) \frac{l^{-\frac{x}{2}}}{2} \int_{-\infty}^{\infty} \cosh(\sqrt{\rho} (x)) I(y/x) dx \tag{118}$$

$$H(y/x) = \frac{(\log_2 l)^{-\frac{\rho}{2}}}{2} \int_{-\infty}^{\infty} [\sqrt{\rho} (x) \sinh(\sqrt{\rho} x) - \cosh \sqrt{\rho} x \ln \cosh \sqrt{\rho} x] dx \tag{119}$$

The first term can be evaluated in closed form. However, the second term offers difficulty. Numerical integration of (119) and (109) yield the following useful table

| = SNR | H(y/x) Hard Decision | H(y/x) Soft Decision |
|---|---|---|
| 0 db | .335 | .486 |
| −10 | .0444 | .0687 |
| −20 | $4.5 \times 10^{-3}$ | $7.16 \times 10^{-3}$ |
| −30 | $4.59 \times 10^{-4}$ | $7.21 \times 10^{-4}$ |
| −40 | $4.59 \times 10^{-5}$ | $7.21 \times 10^{-5}$ |

Using $\sin h (\sqrt{\rho x}) \approx \sqrt{\rho x}$, $\cos h \sqrt{\rho x} = 1 + (\rho x 2/2)$ and $\ln 1 + z \approx z$ results in the approximation for (20c)

$$H(y/x) \approx \frac{(\log_2 l)^{-\frac{\rho}{2}}}{\sqrt{2\pi}} \int_{-\infty}^{\infty} l^{\frac{-x^2}{2}} \rho \frac{x^2}{2} dx \approx$$

$$\frac{\rho}{2} \log_2 l \text{ for small } \rho.$$

The table below indicates a factor of 1.57 improvement in acquisition time for the soft decisions at very low SNR and at 0 db. We have a factor of 3.9 for R10 and a factor of 14.5 for R20.

Let "h" be the transinformation per chip. To compute the overall transinformation we convolve the appropriately scaled $(h)^k$ with the probability of using k chips in the mod 2 sum. The probability of having k chips is binominally distributed with k=0 case deleted.

$$H(y/x) = \frac{2^{-(n+1)}}{1 - 2^{-n}} \log_2 l \sum_{k=1}^{n} \left(\frac{2h}{\log 2}\right)^k \frac{n!}{(n-k)!k!} \quad (120)$$

Carrying out these calculations for n=10 and n=20 results in the following table

|  | SNR db | Improvement Factor | Estimated acquisition time Hard Decision | Soft Decision |
|---|---|---|---|---|
| n = 1 | 0 | 3.87 | 31.9 | 8.26 |
|  | −10 | 1.82 | $1.74 \times 10^3$ | 95.2 |
|  | −20 | 1.58 | $2.17 \times 10^4$ | $1.37 \times 10^4$ |
|  | −30 | 1.58 | $2.22 \times 10^5$ | $1.4 \times 10^5$ |
|  | −40 | 1.57 | $2.33 \times 10^6$ | $1.49 \times 10^6$ |
| n = 20 | 0 | 14.5 | 707 | 48.8 |
|  | −10 | 2.25 | $6.31 \times 10^5$ | $2.61 \times 10^5$ |
|  | −20 | 1.62 | $1.08 \times 10^6$ | $6.67 \times 10^6$ |
|  | −30 | 1.57 | $1.14 \times 10^8$ | $7.14 \times 10^7$ |
|  | −40 | 1.57 | $1.14 \times 10^9$ | $7.25 \times 10^8$ |

In Gaussian noise the biggest improvement is between 0 and −10 db. It should be mentioned in passing for the cases of interference from other codes the improvement should be more impressive. At high noise, about 2 db is gained, and at low noise, about 0 db is gained.

What is claimed is:

1. Apparatus for synchronizing the linear PN sequences contained in the heavy noise background of a receiver data-carrying spread spectrum signal, comprising
   (a) demodulator means (106, 109) for separating from the received signal the noisy wideband PN spread spectrum component, and for generating a chip rate clock signal;
   (b) resident PN generator means (110) responsive to said chip rate clock signal for producing a replica of the PN sequence with arbitrary phase;
   (c) running matrix inverse means (112) for obtaining the inverse $(R^{-1})$ of the matrix (R) that is formed by n successive observations of the register of the resident generator;
   (d) matrix vector product means (118) for multiplying the running inverse by a column vector of noisy chips, thereby to obtain a plurality of estimates of the phase vector;
   (e) means (122) for smoothing and averaging the phase vector estimates, thereby to produce the smoothed phase vector $(c_j)$;
   (f) dot product means (114) responsive to said smoothed phase vector and to the contents of the resident shift register for producing the properly phased PN sequence; and
   (g) despreading means (108) for combining the noisy chips with the properly phased PN sequence, whereby the narrowband digital data carried by the spread spectrum signal may be recovered.

2. Apparatus as defined in claim 1, and further including phase delay computer means (130) for converting the smoothed phase vector to actual phase delay, thereby affording range computation.

3. Apparatus as defined in claim 1, wherein said matrix vector product means includes
   (1) a plurality of AND gates having output terminals, first input terminals $[d_1 \ldots d_n]$ receiving the data signals, and second input terminals connected with corresponding D stages of the running matrix inverse $(R_{ij}$, where j=1 through n, i=1 through n);
   (2) a plurality of mod 2 adders connected with the output terminals of a plurality of said AND gates, respectively, thereby to provide a plurality of phase vector estimates, respectively;
   (3) means for smoothing the individual components of the phase vector; and
   (4) threshold means for deciding polarity of the individual phase vector components.

4. Apparatus as defined in claim 3, wherein said smoothing means comprises an up/down counter.

5. Apparatus as defined in claim 3, wherein said smoothing means comprises an up/down accumulator, and zero counter means for determining the amount by which the up/down accumulator is incremented or decremented.

6. Apparatus as defined in claim 1, wherein said resident PN generator means (110) includes a shift register (4), and recursion means connected with said shift register for producing the next bit depending on the n prior bits, said recursion means having a plurality of known coefficients of recursion $(X_1 \ldots X_{n-1})$; and further wherein said running matrix inverse means includes a plurality of columns i (where i=1 ... m) each including
   (1) a plurality of D stage registers (14);
   (2) a plurality of mod 2 adders (12) connected between said registers, respectively;
   (3) a plurality of AND gates (10) having outputs connected with said mod 2 adders, respectively, each of said AND gates having a pair of input terminals;
   (4) means for applying said known coefficients of recursion $(X_1 \ldots X_{n-1})$ to one input terminal of said AND gates, respectively;
   (5) means for applying to the other input terminal of each of said AND gates a feedback signal provided by a connection between the output of the last D stage and the input of the first D stage of said column; and
   (6) means for loading in parallel to the D stages of each column, respectively, second signals $(Y_{li} \ldots Y_{ni})$ that are known a' priori functions of said coefficients of recursion, thereby loading the initial inverse $(R_o^{-1})$.

7. Apparatus as defined in claim 6, wherein the initial inverse matrix has the form $$R_o^{-1} = \begin{bmatrix} 1 & X_{n-1} & X_{n-2} & & & X_1 \\ 0 & 1 & X_{n-1} & & & X_2 \\ . & 0 & 1 & X_{n-1} & & . \\ . & . & & 0 & & X_{n-1} & . \\ . & . & & . & & & X_{n-1} \\ 0 & 0 & & & & & 1 \end{bmatrix}$$

8. Apparatus as defined in claim 1, wherein said resident PN generator means includes
   (1) a plurality of D stage registers (314);

(2) a plurality of mod 2 adders (312) connected between said registers, respectively;
(3) a plurality of AND gates (310) having outputs connected with said mod 2 adders, respectively, each of said AND gates having a pair of input terminals;
(4) means for applying said known coefficients of recursion ($X_1 \ldots X_{n-1}$) to one input terminal of said AND gates, respectively; and
(5) means for applying to the other input terminal of each of said AND gates a feedback signal provided by a connection between the output of the last D stage and the input of the first D stage of said column;

and further wherein said running matrix inverse means includes a plurality of columns i (where $i=1 \ldots m$) each including
(1) a shift register (304), and recursion means connected with said shift register for producing the next bit depending on the n prior bits, said recursion means having a plurality of known coefficients of recursion ($X_1 \ldots X_{n-1}$); and
(2) means for loading in parallel to the D stages of each column, respectively, second signals ($Y_{1i} \ldots Y_{ni}$) that are known a' priori functions of said coefficients of recursion, thereby loading the initial inverse ($R_o{}^{-1}$).

9. Apparatus as defined in claim 1, wherein said running matrix inverse means (112) includes a plurality of rows i (where $i=1 \ldots m$), each of said rows including
(1) a plurality of D stage registers (404);
(2) a plurality of mod 2 adders (412) connected between said registers, respectively;
(3) a plurality of AND gates (410) having outputs connected with said mod 2 adders, respectively, each of said AND gates having a pair of input terminals;
(4) means for applying said known coefficients of recursion ($X_1 \ldots X_{n-1}$) to one input terminal of said AND gates, respectively; and
(5) means for applying to the other input terminal of each of said AND gates a feedback signal providing by a connection between the output of the last D stage and the input of the first D stage of said row; and (6) means for loading in parallel to the D stages of each row, respectively, second signals ($Y_{i1} \ldots Y_{in}$) that are known a' priori functions of said coefficients of recursion, thereby loading the initial inverse ($R_o{}^{-1}$).

10. Apparatus as defined in claim 5, wherein said zero counter means is operable to count also the number and weight of soft decisions which are used in each matrix vector dot product, thereby to obtain a more accurate up-date of the accumulation.

11. The method for synchronizing the linear PN sequences contained in the heavy noise background of a received data-carrying spread spectrum signal, comprising the steps of
(a) demodulating the received signal to separate therefrom the noisy widebank PN spread spectrum component and to generate a chip rate clock signal;
(b) producing by resident PN generator means in response to the chip rate signal a replica of the PN sequence with arbitrary phase;
(c) obtaining the running matrix inverse ($R_o{}^{-1}$) of the matrix (R) that is formed by n successive observations of the shift register of the resident PN generator means;
(d) multiplying the running inverse by a column vector of noisy chips, thereby to obtain a plurality of estimates of the phase vector;
(e) smoothing and averaging the phase vector estimates to produce the smoothed phase vector ($c_j$);
(f) producing from the smoothed phase vector and the contents of the resident generator shift register a properly phased PN sequence; and
(g) combining the noisy chips with the properly phased PN sequence, thereby to permit recovery of the narrowband digital data carried by the spread spectrum signal.

12. The method as defined in claim 11, and further including the step of delaying the phase of the smoothed averaged phase vector for use in range computation.

13. The method as defined in claim 12, and further including the step of combining phase-advanced adn phase-retarded versions of the properly phased PN sequence to produce a combined control signal ($V_1-V_2$) for synchronizing the chip rate clock.

* * * * *